United States Patent
Youngblood et al.

(10) Patent No.: US 12,281,216 B2
(45) Date of Patent: Apr. 22, 2025

(54) CONTINUOUS PROCESSING OF CELLULOSE NANOFIBRIL SHEETS THROUGH CONVENTIONAL EXTRUSION

(71) Applicants: Purdue Research Foundation, West Lafayette, IN (US); U.S. DEPARTMENT OF AGRICULTURE, Madison, WI (US)

(72) Inventors: Jeffrey Paul Youngblood, Crawfordsville, IN (US); Sami Miguel El Awad Azrak, Midland, MI (US); Gregory T. Schueneman, Madison, WI (US); Robert John Moon, Marietta, GA (US)

(73) Assignees: Purdue Research Foundation, West Lafayette, IN (US); U.S. Department of Agriculture, Madison, WI (US)

( * ) Notice: Subject to any disclaimer, the term of this patent is extended or adjusted under 35 U.S.C. 154(b) by 212 days.

(21) Appl. No.: 17/908,845

(22) PCT Filed: Mar. 1, 2021

(86) PCT No.: PCT/US2021/020178
§ 371 (c)(1),
(2) Date: Sep. 1, 2022

(87) PCT Pub. No.: WO2021/178262
PCT Pub. Date: Sep. 10, 2021

(65) Prior Publication Data
US 2023/0115147 A1    Apr. 13, 2023

Related U.S. Application Data

(60) Provisional application No. 63/003,313, filed on Apr. 1, 2020, provisional application No. 62/983,975, filed on Mar. 2, 2020.

(51) Int. Cl.
*C08L 1/02* (2006.01)
*C08J 5/18* (2006.01)
(Continued)

(52) U.S. Cl.
CPC . *C08L 1/02* (2013.01); *C08J 5/18* (2013.01); *D21H 11/18* (2013.01); *D21H 17/26* (2013.01);
(Continued)

(58) Field of Classification Search
CPC ........ D21H 11/18; D21H 17/26; D21H 27/26; C08J 5/18; C08J 2301/02; C08J 2401/28;
(Continued)

(56) References Cited

U.S. PATENT DOCUMENTS 6,113,829 A * 9/2000 Bookbinder .......... C04B 35/622
264/630
6,143,216 A * 11/2000 Loch ....................... H01M 4/13
264/122
(Continued)

FOREIGN PATENT DOCUMENTS

WO    2017155456 A1    9/2017

OTHER PUBLICATIONS

Wang, Q. et al., Processing nanocelulose to bulk materials: a review. Cellulose 2019, 26, 7585.
(Continued)

*Primary Examiner* — Jacob T Minskey
*Assistant Examiner* — Elisa H Vera
(74) *Attorney, Agent, or Firm* — Schwegman Lundberg & Woessner, P.A.

(57) ABSTRACT

The present disclosure provides to a novel continuous processing method to prepare sheets comprising cellulose nanofibril (CNF) and carboxymethyl cellulose (CMC). Single screw extrusion was utilized to continuously process
(Continued)

mechanically fibrillated cellulose nanofibrils (CNF) into sheets. Water-retention ability and stability of CNF suspensions containing different processing aids was assessed through centrifugation and zeta potential analysis. Subsequently, highly loaded pastes (up to ~25 wt. % total solids content) containing the best performing processing aids (carboxymethyl cellulose (CMC), xanthan gum (XG), and anionic polyacrylamide (aPAM)) and CNF were prepared using a Brabender with Banbury mixer-head at a dry weight ratio of either 0.1 to 1 or 0.15 to 1, respectively. Validation of the mixing procedure proved that highly loaded CNF pastes can be processed in under 40 minutes, saving up to 40 days in preparation and drying time.

7 Claims, 8 Drawing Sheets

(51) Int. Cl.
    *D21H 11/18*   (2006.01)
    *D21H 17/26*   (2006.01)
    *D21J 3/00*    (2006.01)
(52) U.S. Cl.
    CPC ............. *D21J 3/00* (2013.01); *C08J 2301/02* (2013.01); *C08J 2401/28* (2013.01); *C08L 2205/025* (2013.01); *C08L 2205/16* (2013.01)
(58) Field of Classification Search
    CPC ...... C08L 2205/025; C08L 1/02; C08L 1/286; C08L 2205/16; D21J 1/00; D21J 3/00
    See application file for complete search history.

(56) References Cited

U.S. PATENT DOCUMENTS

| | | |
|---|---|---|
| 8,012,573 B2 | 9/2011 | Kowata et al. |
| 2018/0319143 A1 | 11/2018 | Neagu et al. |
| 2022/0021075 A1* | 1/2022 | Ishiguro .................. B05D 7/24 |

OTHER PUBLICATIONS

Hietala, M. et al., Bionanocomposites of thermoplastic starch and cellulose nanofibers manufactured using twin-screw extrusion. Eur. Polym. J. 2013, 49, 950.
Gong, G. et al., Tensile behavior, morphology and viscoelastic analysis of cellulose nanofiger-reinforced (CNF) polyvinyl acetate (PVAc). Compos. Part A Appl. Sci. Manuf. 2011, 42, 1275.
Jonoobi, M. et al., Mechanical properties of cellulose nanofiber (CNF) reinforced polylactic acid (PLA) prepared by twin screw extrusion. Compos. Sci. Technol. 2010, 70, 1742.
Herrera, N. et al., Plasticized polylactic acid/cellulose nanocomposites prepared using melt-extrusion and liquid feeding: Mechanical, thermal and optical properties. Compos. Sci. Technol. 2015, 106, 149.
Oksman, K. et al., Manufacturing process of cellulose whiskers/ polylactic acid nanocomposites. Compos. Sci. Technol. 2006, 66, 2776.
Sharma, A. et al., Commercial application of cellulose nanocomposites—A review. Biotechnol. Reports, 2019, 21, e00316.
Nechyporchuk, O. et al., Current Progress in Rheology of Cellulose Nanofibril Suspensions. Biomacromolecules 2016, 17, 2311.
Samaniuk, J. R. et al., Rheological modification of corn stover biomass at high solids concentrations. J. Rheol. (N. Y. N. Y). 2012, 56, 649.
Kulkarni, V. S. et al., Use of Polymers and Thickeners in Semisolid and Liquid Formulations. Essent. Chem. Formul. Semisolid Liq. Dosages, Chapter 5, Academic Press, 2016, pp. 43-69.
Liimatainen, H. et al., Influence of Adsorbed and Dissolved Carboxymethyl Cellulose on Fibre Suspension Dispersing, Dewaterability, and Fines Retention. BioResources 2009, 4, 321-340.
Scott, C. T., Pulp Extrusion ate Ultra-High Consistencies: Selection of Water-Soluble Polymers for Process Optimization. in TAPPI Fall Tech. Conf. Trade Fair, 2002, pp. 1621-1629.
Yan, H. et al., Some ways to decrease fibre suspension flocculation and improve sheet formation. Nord. Pulp Pap. Res. J. 2006, 21, 36.
Beghello, L. et al., The influence of carboxymethylation on the fiber flocculation process. Nord. Pulp Pap. Res. J. 1998, 13, DOI 10.3183/ npprj-1998-13-04-p269-273.
Watanabe, M. et al., Advanced wet-end system with carboxymethyl cellulose. Tappi 2004, 3, 15.
Samaniuk, J. R. et al., Effects of process variables on the yield stress of rheologically modified biomass. Rheol. Acta 2015, 54:941-949.
International Search Report and Written Opinion issued by the ISA/US, Commissioner for Patents, mailed May 13, 2021, for International Application No. PCT/US2021/020178.
El Awad Azrak, S. M. et al., Continuous Processing of Cellulose Nanofibril Sheets Through Conventional Single-Screw Extrusion, ACS Applied Polymer Materials, vol. 2, Jun. 25, 2020, 3365-3377.

* cited by examiner

CONTINUOUS PROCESSING OF CELLULOSE NANOFIBRIL SHEETS THROUGH CONVENTIONAL EXTRUSION

CROSS-REFERENCE TO RELATED APPLICATIONS

The present U.S. patent application is a national stage entry under 35 U.S.C. § 371 (b) of International Application No. PCT/US2021/020178, filed Mar. 1, 2021, which relates to and claims the priority benefit of U.S. Provisional Application No. 62/983,975 filed Mar. 2, 2020 and U.S. Provisional Application No. 63/003,313, filed Apr. 1, 2020, the contents of which are hereby incorporated by reference in their entireties.

TECHNICAL FIELD

The present disclosure relates to a novel continuous processing method to prepare sheets comprising cellulose nanofibril (CNF) and carboxymethyl cellulose (CMC), and to sheets made by the novel method.

BACKGROUND

This section introduces aspects that may help facilitate a better understanding of the disclosure. Accordingly, these statements are to be read in this light and are not to be understood as admissions about what is or is not prior art.

Cellulose nanomaterials (CNM) like cellulose nanofibrils (CNF) were first isolated through homogenization of bleached cellulose pulp in the early 1980s. The extracted CNMs possess high aspect ratios (L/D=5 to 500), high crystalline contents (27% to >80%, depending on the source and extraction process), and native surface hydroxyl groups that can form hydrogen bonds with surrounding fibers. Due to their morphological properties, inherent sustainability, uniformity, and their abundance in nature, CNMs have become a very attractive material to reduce the dependence on oil-derived synthetic polymers.

Over the years, improved mechanical processes (e.g., disk refining for isolation of the fibril-like CNF) and improved acid hydrolysis processes (e.g., improved acid recovery for isolation of the rod-like cellulose nanocrystals (CNC)) have increased the production capacity (up to 1000 kg/day dry equivalent). This has allowed for CNMs to be readily accessible in a laboratory setting and industrial research settings and has accelerated their development into usable forms that attain significantly higher properties when compared to commodity polymers. For example, CNC have been used as coatings for food packaging materials or as a reinforcing phase in cellulose nanocomposites. In addition, CNFs have been formed into strong isotropic films achieving ultimate strength values of up to 232±19 MPa and a Young's modulus of 13.4±0.25 GPa with a density of ~1.4 g/cm$^3$ and a thickness of 60 μm. Multilayer CNF structures or laminates with a thickness of up to 1.65 mm have also been reported and could serve in high-strength and lightweight structural and packaging applications. Yet, current laboratory techniques like solution casting used to process CNM films remain largely semiautomatic and often require long lead times (hours to weeks) for complete water removal or consolidation of the structure.

Extrusion-based processes are one of the most widely used continuous polymer processing techniques due to the commercial availability, versatility, and cost effective scalability. The majority of commodity polymers in today's market are processed in some way through extrusion-based processes. Extrusion has also been employed to bulk process bio-sourced polymers like wood. For example, wood-plastic composites (WPC) with a wood content ranging from 40 to 70 wt. % and different polymer matrices (e.g. polypropylene, low and high density polyethylene, and polyvinyl chloride) were successfully extruded into linear elements. In WPC, wood fibers or wood flour adds stiffness to the polymer matrix while acting as an inexpensive filler. WPC have found uses as structural materials for decking, flooring, fencing, furniture, automotive interiors, and even cutlery. Similarly, extrusion-based processes have offered a way to effectively bulk process CNMs nanocomposites.

Bulk processing of CNMs have mainly focused on the formation of cellulose nanocomposite films or sheets by first compounding CNMs and a matrix polymer using an extruder and subsequently compression or injection molding the compounded material into shape. For example, Hietala et al. employed a twin screw extruder (co-rotating configuration, L/D=40) to compound thermoplastic starch (TPS) and CNF. Subsequently, through compression molding, transparent TPS/CNF sheets with a thickness of ~0.3 mm and a final CNF content of up to 20 wt. % where prepared. See Hietala, M.; Mathew, A. P.; Oksman, K. Bionanocomposites of Thermoplastic Starch and Cellulose Nanofibers Manufactured Using Twin-Screw Extrusion. *Eur. Polym. J.* 2013, 49 (4), 950-956. Even though some kind of successful, the extrusion of cellulose nanocomposites is still largely limited by the incompatibility between the hydrophilic reinforcing phase (e.g., CNMs) and the hydrophobic matrix (e.g., synthetic polymer). The addition of higher contents (>20 wt. %) of CNMs into a synthetic polymer matrix eventually leads to aggregation and lowers the mechanical properties of the nanocomposites. Furthermore, extrusion processes typically require a meltable phase while CNMs and cellulose derivatives reach their degradation temperature ($T_d$) before reaching their melting temperature ($T_m$) which limits both the processing temperature window and the possible synthetic matrices ($T_{m, polymer\ matrix}$<200° C.).

One solution to this complex problem is to bulk process CNMs without the use of any synthetic polymer matrix (i.e. ~100% pure CNMs structures). This eliminates incompatibility issues with hydrophobic polymer matrices and gives the ability to take full advantage of the impressive CNM properties. However, this introduces new processing challenges; the first being the inability of pure CNMs to melt and form tangled polymer networks, hence similar viscoelastic properties like that of polymer melts are hard to achieve and have not been reported. Second, due to the isolation processes used to extract CNMs, a significant amount of water is retained by CNMs (>80 wt. % water) and must be removed, hence a high hydraulic capacity is needed during processing and forming. Freeze drying methodologies to remove almost all of the water (can achieve ~96 wt. % solids content) have been developed, yet careful control is needed to avoid permanent aggregation of the CNMs and surfactants are sometimes needed and must be removed following rehydration. Lastly, CNMs slurries are two phase materials composed of cellulose nanoparticles and water, which makes the rheological control more complex during processing. Though challenging, extrusion of mostly pure CNMs will open up new ways towards bulk continuous processing that are otherwise not be possible with batch based or semiautomatic techniques.

Therefore, there is an unmet need for continuous processing methods to make high solid content CNM films/sheets.

SUMMARY

The present disclosure relates to a novel continuous processing method to prepare sheets comprising cellulose nanofibril (CNF) and carboxymethyl cellulose (CMC), and to sheets made by the novel method.

In one embodiment, the present disclosure provides a continuous processing method to prepare a sheet comprising cellulose nanofibril (CNF) and carboxymethyl cellulose (CMC), wherein the method comprises:

- providing a homogenous aqueous mixture comprising cellulose nanofibril (CNF) and carboxymethyl cellulose (CMC), wherein the homogenous aqueous mixture has a solid content of 10-30 wt. %, and the homogenous aqueous mixture has a carboxymethyl cellulose (CMC) to cellulose nanofibril (CNF) weight ratio range of 0.03:1 to 0.3:1;
- providing an extruder;
- loading the homogenous aqueous mixture comprising cellulose nanofibril (CNF) and carboxymethyl cellulose (CMC) to the extruder; and
- extruding the homogenous aqueous mixture comprising cellulose nanofibril (CNF) and carboxymethyl cellulose (CMC) to provide a wet sheet comprising cellulose nanofibril (CNF) and carboxymethyl cellulose (CMC), wherein the sheet has a carboxymethyl cellulose (CMC) to cellulose nanofibril (CNF) weight ratio range of 0.03:1 to 0.3:1.

DETAILED DESCRIPTION

Figure 1:
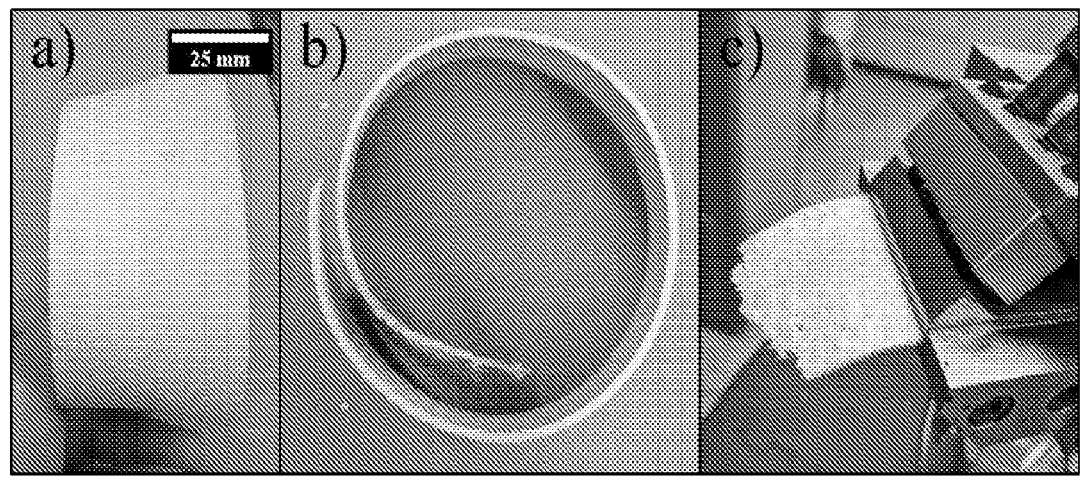
FIG. 1 illustrates extrudate of pure CNF originally at 30 wt. % solids concentration a) front view (width was ~50 mm), b) side view (thickness ~1.1 mm), and c) coming out of the slot die. The extrudate had a solids concentration of ~85 wt. % coming right out of the die. The total length of the pure CNF sheet was ~330 mm (13 inches). The sheet was very fragile and easily broken into pieces.

For the purposes of promoting an understanding of the principles of the present disclosure, reference will now be made to embodiments illustrated in drawings, and specific language will be used to describe the same. It will nevertheless be understood that no limitation of the scope of this disclosure is thereby intended.

In the present disclosure the term "about" can allow for a degree of variability in a value or range, for example, within 10%, within 5%, or within 1% of a stated value or of a stated limit of a range.

In the present disclosure the term "substantially" can allow for a degree of variability in a value or range, for example, within 90%, within 95%, or within 99% of a stated value or of a stated limit of a range.

This disclosure provides a novel continuously processed wet CNF sheet using conventional single-screw extrusion. Water-retention ability and stability of dilute CNF suspensions containing different processing aids was assessed through centrifugation and zeta potential analysis. Subsequently, highly loaded extrusion pastes (up to ~25 wt. % total solids contents) containing the best performing processing aids (carboxymethyl cellulose (CMC), xanthan gum (XG), and anionic polyacrylamide (aPAM)) and CNF were prepared using a Brabender with Banbury mixer-head at a dry weight ratio of either 0.05 to 1, 0.1 to 1, or 0.15 to 1 (e.g., aid:CNF). To better understand the rheological differences between the prepared extrusion pastes, torque rheometry was performed. Surprisingly, the extrusion output of ~15 wt. % CNF/CMC pastes peaked at a rate of ~7.45 kg/h (wet or ~1.14 kg/h dry) at a screw speed of 110 rpm without the introduction of typical surface defects on the extrudate sheets. The mechanical properties of the pressed and heated CNF/aid sheets were assessed through conventional tensile testing and compared against solution cast CNF films. The Brabender mixing procedure was validated against typical air drying to achieve higher solids loadings in CNF/processing aid pastes. Lastly, calendering of the wet extrudates was also performed.

In one embodiment, the present disclosure provides a continuous processing method to prepare a sheet comprising cellulose nanofibril (CNF) and carboxymethyl cellulose (CMC), wherein the method comprises:
providing a homogenous aqueous mixture comprising cellulose nanofibril (CNF) and carboxymethyl cellulose (CMC), wherein the homogenous aqueous mixture has a solid content of 10-30 wt. %, and the homogenous aqueous mixture has a carboxymethyl cellulose (CMC) to cellulose nanofibril (CNF) weight ratio range of 0.03:1 to 0.3:1;
providing an extruder;
loading the homogenous aqueous mixture comprising cellulose nanofibril (CNF) and carboxymethyl cellulose (CMC) to the extruder; and
extruding the homogenous aqueous mixture comprising cellulose nanofibril (CNF) and carboxymethyl cellulose (CMC) to provide a wet sheet comprising cellulose nanofibril (CNF) and carboxymethyl cellulose (CMC), wherein the sheet has a carboxymethyl cellulose (CMC) to cellulose nanofibril (CNF) weight ratio range of 0.03:1 to 0.3:1.

In one embodiment regarding the continuous processing method, wherein the homogenous aqueous mixture with a solid content of 10-30 wt. % is obtained in a high shear torque mixer to achieve a full incorporation between cellulose nanofibril (CNF) and carboxymethyl cellulose (CMC), and the full incorporation of cellulose nanofibril (CNF) and the carboxymethyl cellulose (CMC) is characterized by a steady rise in torque until a plateau of torque value is achieved, wherein the homogenous aqueous mixture is capable of being prepared in less than one hour.

In one embodiment regarding the continuous processing method, wherein the wet sheet is warm pressed to provide a dry sheet with a carboxymethyl cellulose (CMC) to cellulose nanofibril (CNF) weight ratio range of 0.03:1 to 0.3:1. In one aspect, the range is 0.03:1 to 0.2:1, 0.03:1 to 0.1:1, 0.05:1 to 0.2:1, 0.05:1 to 0.15:1, 0.1:1 to 0.2:1, or 0.1:1 to 0.15:1. In one aspect, a preferred ratio is about 0.1:1.

In one embodiment regarding the continuous processing method, wherein the homogenous aqueous mixture has a solid content of 10-25, or 10-20 wt. %.

In one embodiment regarding the continuous processing method, wherein the extruder is a single screw extruder.

In one embodiment regarding the continuous processing method, wherein a maximum wet production rate of 7.45±0.47 kg/h or a maximum 1.14±0.072 kg/h in dry state can be achieved at a screw speed of 110 rpm when the homogenous aqueous mixture has about 15 wt. % total solids.

In one embodiment, the present disclosure provides a material comprising carboxymethyl cellulose (CMC) and cellulose nanofibril (CNF), wherein the material has a carboxymethyl cellulose (CMC) to cellulose nanofibril (CNF) weight ratio range of 0.03:1 to 0.3:1, wherein the material is made by a step-by-step method or a continuous processing method provided in this disclosure. In one aspect, the range is 0.03:1 to 0.2:1, 0.03:1 to 0.1:1, 0.05:1 to 0.2:1, 0.05:1 to 0.15:1, 0.1:1 to 0.2:1, or 0.1:1 to 0.15:1. In one aspect, a preferred ratio is about 0.1:1.

In one embodiment, the present disclosure provides a molding method to prepare a molded material comprising cellulose nanofibril (CNF) and carboxymethyl cellulose (CMC), wherein the method comprises:
providing a homogenous aqueous mixture comprising cellulose nanofibril (CNF) and carboxymethyl cellulose (CMC), wherein the homogenous aqueous mixture has a solid content of 10-30 wt. %, and the homogenous aqueous mixture has a carboxymethyl cellulose (CMC) to cellulose nanofibril (CNF) weight ratio range of 0.03:1 to 0.3:1;
providing a mold;
loading the homogenous aqueous mixture comprising cellulose nanofibril (CNF) and carboxymethyl cellulose (CMC) to the mold; and
molding the homogenous aqueous mixture comprising cellulose nanofibril (CNF) and carboxymethyl cellulose (CMC) to provide a material with a desired shape comprising cellulose nanofibril (CNF) and carboxymethyl cellulose (CMC), wherein the sheet has a carboxymethyl cellulose (CMC) to cellulose nanofibril (CNF) weight ratio range of 0.03:1 to 0.3:1

Experimental Sections

Materials

Carboxylated methyl cellulose sodium salt powder (e.g., CMC) was purchased from Alfa Aesar (Lot #R07E012, D.S 0.69, η=660 mPa*s at 1% v/v at 25° C., $M_w$~150,000 to 180,000). An anionic polyacrylamide (aPAM) "water in oil" type emulsion (Nalclear™ 7768) was kindly supplied by Nalco Water (EcoLab). The solids content of the aPAM emulsion was found to be ~32 wt. %. The average molecular weight of the polyelectrolyte (aPAM) was not measured, but it is generally expected to be at least in the millions range and has a linear molecular structure. Xanthan Gum (XG) from *Xanthomonas campestris* was purchased from Sigma-Aldrich (Lot #SLBZ5317, η=800 to 1200 mPa*s at 1% v/v at 25° C., $M_w$ was not supplied but has been reported to vary between 300,000 and $7.5*10^6$). Mechanically fibrillated CNFs produced at the Process Development Center (PDC) were bought from University of Maine, Orono, ME, USA at two different solids concentration, 3.1 wt. % (Batch #110, 90% retained fines) and ~23.5 wt. % (Batch #122) both in water. This variety of CNF is more coarse (e.g., diameter ~20 to 100 nm) and branched (e.g., thicker central fibril with thinner fibrils extending off), this material often has been referenced in the literature as cellulose microfibrils (CMF).

The process of isolating/making the CNF slurry is explained in detail by C. A. de Assis et al. The CNF was used as delivered without any surface or solvent modification/exchange and mixed with CMC, XG, or aPAM at different ratios by dry weight.

Two stainless steel meshes ("Dutch weave", 316SS) with a mesh size of 165×800, and two temperature resistant silicone rubber sheets with a hardness of 60 A were purchased from McMaster Carr Supply Company, Elmhurst, IL, USA. Both materials were cut down to a square size of 115×115 mm (L×W) and used for pressing the extrudates.

Preparation of CNF/Processing Aid Suspensions for Centrifugation and Zeta Potential CNF plus processing aid suspensions for centrifugation/separation column test were prepared by first fully dissolving the processing aid in water and then mixing it with a CNF slurry at 3.1 wt. %. Two different dry weight ratios of processing aid to CNF of 0.1:1 and 0.05:1 were prepared. The suspensions were shear-mixed using a SpeedMixer™ (Flacktek Inc.) system at 2500 rpm for 15 minutes. Subsequently, 35 ml of the suspensions were loaded into 50 ml centrifugation tubes (Falcon®) and centrifuged (HERMLE Z300, Hermie Labortechnik GmbH, Germany) at 4500 rpm for 30 minutes (RCF ~3500). The separated water was weighed on an analytical balance and recorded.

Suspensions for zeta potential analysis were prepared identically to the suspensions intended for centrifugation with a processing aid ratio to CNF of 0.05:1 yet diluted with deionized water from a ~3 wt. % solids concentration to 0.13 wt. %. Once the water was added the suspensions were shear mixed at 4500 rpm for 3 minutes. A transfer pipette (3 ml) was used to transfer the suspensions into the disposable capillary cells.

Preparation of Extrusion Pastes

Pure CNF with a solids concentration of 10, 17, 20, 24, and 30 wt. % were prepared by air drying an initial 3.1 wt. % CNF slurry at room temperature. Following drying, the pastes were blended using a common household blender until fully homogenous. The pastes were then extruded.

Figure 9:
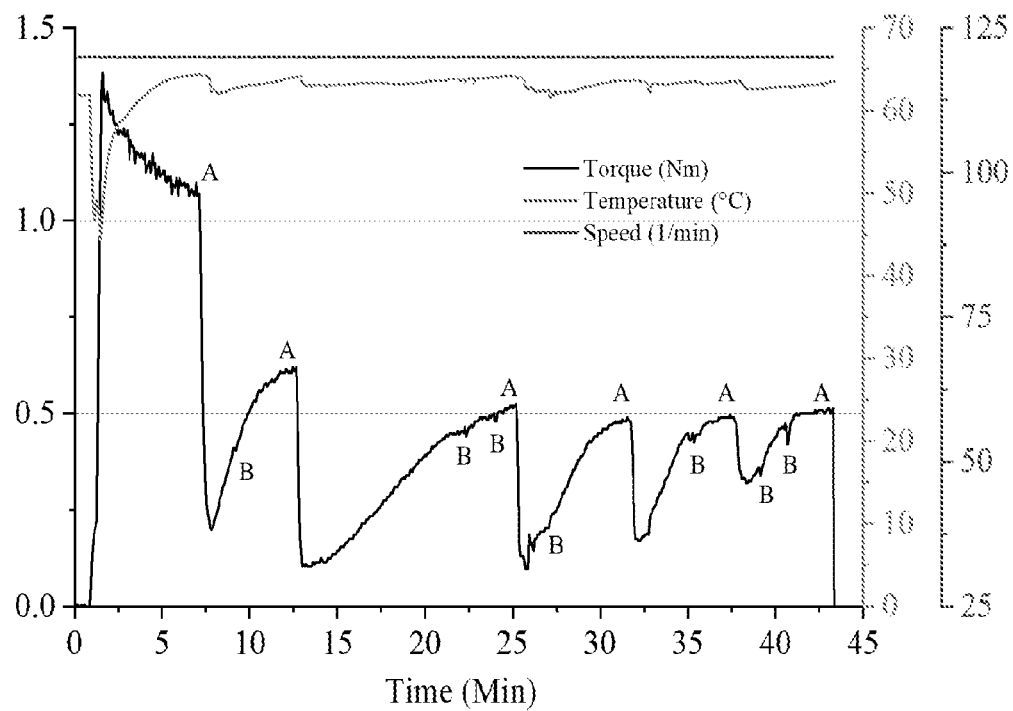
FIG. 9 illustrates recorded torque (Nm), temperature (° C.), and mixing speed (rpm) during mixing of a CNF/CMC paste in a Brabender high shear torque mixer. The "A" points mark the addition of CMC while the "B" points mark the addition of water. The final paste solids concentration was 15.32 wt % with a CMC to CNF dry weight ratio of 0.1:1. The plateau represents complete polymer incorporation into the paste and depend on the added polymer and final solids concentration of the paste.

CNF/processing aid pastes (CNF/CMC, CMC/XG, and CNF/aPAM) with solids concentration of ~15.32 wt. % or greater were prepared using a high shear torque mixer (Plasti-Corder PL 2100 Electronic Torque Rheometer, C. W. Brabender, South Hackensack, NJ) equipped with Banbury type mixing blades. Geometrical data as well as a detailed schematic of the setup are presented in other literature. All the CNF/processing aid pastes were prepared by first adding 52 grams of CNF with a solids concentration of ~23.5 wt. % into the mixer. The added CNF was mixed at 120 rpm and a temperature of 60° C. until the output torque curve reached a plateau, which on average took ~5 to 8 minutes (FIG. 9). After reaching the torque plateau, the required amount of processing aid was gradually added in smaller discrete steps to the paste until a ratio of 0.05:1 or 0.1:1 was reached (aid:CNF, both dry weight). It is important to note that adding the processing aid caused a significant drop in torque. Water was added as needed into the paste to control the final solids concentration and replace the lost water during mixing (~1 wt. % solids increase for a mixing time of 40 min). During mixing, the rotor speed was held at 120 rpm for CNF/CMC pastes and was lowered to 20 rpm for CNF/XG and CNF/aPAM pastes to avoid improper mixing due to the material sticking or slipping at the mixing blades. The pastes were mixed until the processing aid was fully incorporated into the paste. For all processing aids, full incorporation was signaled by a steady rise in torque and a secondary plateau (FIG. 9). It is important to point out that if the torque plateaus are not reached the processing aid will not be fully incorporated into the CNF slurry and the resulting pastes will have a grainy consistency (FIG. 9). Samaniuk et al. investigated in more detail the observed relationships between torque drop, drop time, and processing aid concentration for corn stover pastes in a similar torque rheometer. The total paste preparation time for a single batch (~66 grams at ~15 wt. %) was roughly between ~30 to 40 minutes depending on how quickly the plateaus were reached (FIG. 9). Unlike CMC and XG, lower concentrations for aPAM were used (0.026:1 and 0.013:1) as aPAM could not be incorporated completely at a ratio of 0.1:1 or 0.05:1 (i.e. the torque plateau will not be reached and resulted in grainy and inhomogeneous paste). For all concentrations, the mixing procedure was repeated three times to yield enough material to perform both extrusion and rheological analysis. Table 1 shows the different pastes prepared for extrusion.

TABLE 1

Summary table showing all the processed highly loaded extrusion pastes prepared. These pastes were extruded and hot pressed. Enough material for each batch was prepared to perform extrusion and rheological analysis

| Extrusion Paste | Mixture Ratio (processing aid to CNF) | Final Solids Concentration [wt %] |
|---|---|---|
| CNF/CMC | 0.1:1 | 15.32 |
| CNF/CMC | 0.1:1 | 19.14 |
| CNF/CMC | 0.1:1 | 25.31 |
| CNF/CMC | 0.05:1 | 15.32 |
| CNF/XG | 0.1:1 | 15.32 |
| CNF/XG | 0.05:1 | 15.32 |
| CNF/aPAM | 0.026:1 | 15.32 |
| CNF/aPAM | 0.013:1 | 15.32 |

CNF/CMC air dried pastes denoted by "AD" were prepared by first fully dissolving CMC powder in water to reach a concentration of ~2.0% (w/v). The viscous CMC solution was then added to a CNF slurry with a solids concentration of 3.1 wt. % to match a dry weight ratio of 0.1:1 (CMC: CNF). Subsequently, the solution was mixed using a planetary SpeedMixer™ (Flacktek Inc.) system at 2500 rpm for 2 minutes and cast into large glass baking trays, crystallization dishes, or 400 ml beakers. The pastes were left to dry slowly inside a humidity-controlled chamber (Memmert GmbH+Co. KG, humidity Chamber HCP240) at a temperature of 35° C., and humidity of 95% RH until reaching the desired solids concentration.

It is important to point out that throughout this report the word "paste" will refer to CNF/processing-aid mixtures which have a high total solids content and are intended to be extruded. On the other hand, the word "suspension" will be used for low total solids (≤3 wt. %) content aqueous-based mixtures like those used for centrifugation, and zeta potential.

Solids Content Calculation

For all the suspensions and pastes processed, the total solids concentration or solids loading (wt. %) was calculated by weighing roughly 1 g of the suspension, paste, or extrudate and then drying in an oven overnight (>12 h) at 110° C. with subsequent re-weighing.

Preparation of Cast CNF Film

Cast CNF films were prepared by casting 40 grams of a CNF/water suspension with a total solids concentration of 1 wt. % into a 90 mm diameter polypropylene Petri dish. The Petri dishes were left to dry at in a humidity controlled chamber (35% RH, 25° C.) for over 7 days. Once dried the films were easily delaminated from the petri dish.

Torque Viscometry of CNF/CMC, CNF/XG and CNF/aPAM Pastes

A Brabender torque rheometer (Plasti-Corder PL 2100 Electronic Torque Rheometer, C. W. Brabender, South Hackensack, NJ), equipped with roller head blades, was used to measure the viscosity-shear rate dependence of the CNF/CMC, CNF/XG and CNF/aPAM pastes. Examples from the literature have shown that small chambered torque rheometers are a practical means to obtain the viscosity-shear rate behavior of polymer-based systems. The torque-temperature dependence must be characterized to correct the final viscosity data for viscous dissipation effects. The analysis used in this study was slightly modified from the process described by Costakis et al. and the details are explained below. See Costakis, W. J.; Schlup, A. P.; Youngblood, J. P.; Trice, R. W. Aligning α-Alumina Platelets via Uniaxial Pressing of Ceramic-Filled Polymer Blends for Improved Sintered Transparency. 2019.

For the analysis, the sample chamber was loaded to 70% of the total volume (60 cm$^3$) with the CNF/processing aid paste and mixed at an initial temperature of 21° C. with a roller speed of 10 rpm for 7 minutes. Once the torque and temperature were stable, the torque data was collected at 21, 28, and 32° C. for three minutes to characterize the torque-temperature dependence. The viscosity temperature sensitivity constant (b) was obtained from an exponential fit of the torque vs temperature graph. This constant was used in Equation 1 to correct the measured viscosity data for temperature increases due to viscous dissipation:

$$\Gamma(T) = \Gamma(T_0) \exp[-b(T - T_0)] \quad 1$$

where $\Gamma(T)$ is torque as a function of temperature, T is the set temperature, and $T_o$ is the measured temperature of the blend. After the torque-temperature analysis, the sample was removed and replaced with another sample from the same batch to reduce drying effects. Then, the temperature was set to 28° C. and the roller speed was decreased to 10 rpm. Torque data was collected at 10, 20, 30, 50, 70, and 90 RPM in three-minute intervals to obtain the torque-rpm dependence of each blend. The calibration and analysis suggested by Bousmina et al.[41] was applied to obtain the shear-rate and viscosity data. The details for the calibration process and calculating the effective equivalent internal radius ($R_i$) are explained in detail by Costakis et al.[45] Once $R_i$ was obtained it was used in the following equations to calculate the shear rate from Equation 2 and viscosity from Equation 3 for each paste.

$$\dot{\gamma} \approx \frac{2\pi N}{\ln\left(\frac{R_c}{R_i}\right)} \quad 2$$

$$\eta = \frac{\Gamma}{N} \frac{\left(\frac{R_c}{R_i}\right)^2 - 1}{8\pi^2 L R_c^2 \cdot (1 + g^2)} \quad 3$$

The log(viscosity) dependence on log(shear rate) was linearly fit to obtain the power law index (n) and melt consistency index (m) for each paste.

In addition to this analysis, a controlled shear stress response rheometry was performed using a Malvern Bohlin Gemini HR Nano Rheometer with a cup and bob fixture (C25 DIN 53019). Aliquots of the highly loaded extrusion pastes (CNF/CMC, CNF/XG, CNF/aPAM) were diluted to 1 wt. %. The diluted suspensions were loaded using a syringe, roughly 12 ml was added. A gap of 150 µm was set for all experiments. A pre-shear of 1 s$^{-1}$ for 60 see was applied to erase the loading history. A shear range of 0.1 to 100 s$^{-1}$ was probed with an integration time of 10 seconds, a delay time of 10 seconds, and 30 sample points. The temperature of the fixture was controlled at 25° C.

Zeta Potential

Dilute suspensions of CNF plus processing aid with a final concentration of 0.13% (w/v) were prepared for zeta potential analysis. A dry-weight ratio of CNF to processing aid of 1:0.05 was used (except for aPAM with a ratio of 0.025:1 due to the high viscosity). A larger CNF content in suspension allowed a good number of particles for scattering (>100,000 counts/sec) and a lower processing aid content did not significantly increase the viscosity of the suspensions. The viscosity of each different suspension was not measured but assumed to be that of water. The pH of each suspension was measured with a pH meter (HANNA® Instruments). Unless stated otherwise, the pH of the suspensions prepared was 6.4. A total of 6 zeta potential measurements were collected using a Zetasizer Nano ZS (Malvern Panalytical) and disposable folded capillary cells (DTS1070). The average value between all six measurements was taken to be the final zeta potential and the standard deviation was calculated for the measurements.

Extruder Configuration and Extrusion Parameters

The pastes were extruded using the Brabender torque rheometer (ATR) unit with an attached single screw extruder unit (L/D=25, barrel diameter of 1.9 cm (¾ inch), and 4 independent heating zones). A conventional 3:1 compression screw was used to extrude all pastes. An adjustable 2-inch-wide slot die/sheet die was attached to the end of the extruder to form the extrudates into rectangular sheets. The initial width of the slot die (i.e. wet sheet thickness) was adjusted to be 1.131 mm by using feeler gages. For all extrusions performed ~75 grams of the paste were loaded into the feeder section with the use of an in-house made plunger as the ~15 wt. % pastes were too viscous to be gravity fed. Roughly 61 cm long sheets were produced for each experiment performed. Unless stated differently, all the extrusions were performed at screw speed of 7 rpm and a temperature of 25° C. in all heating zones. The pressure before the die, screw torque, and barrel temperature was recorded during extrusion.

Sample Preparation for Mechanical Testing

Figure 11:
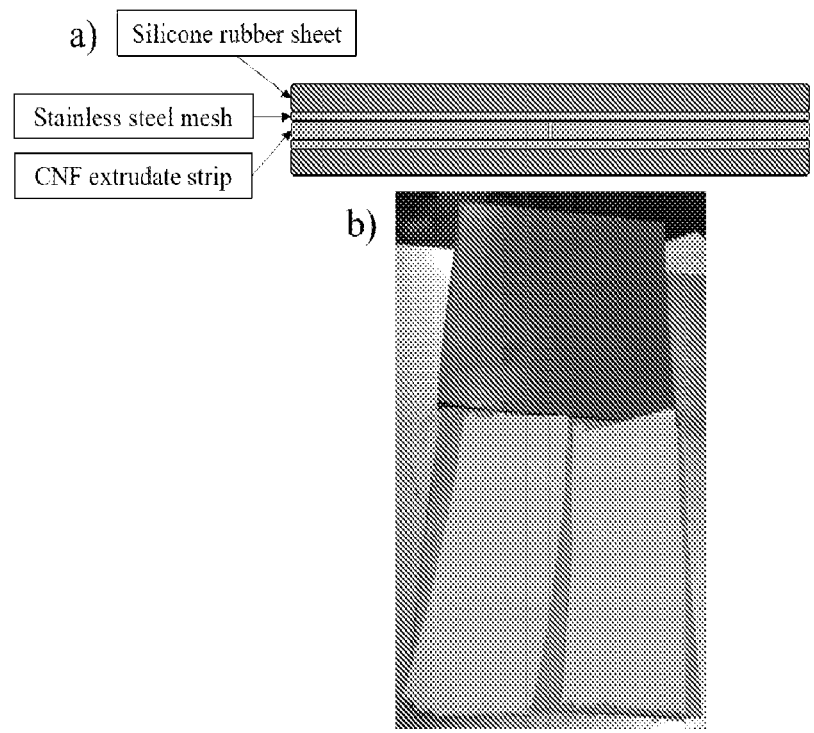
FIG. 11 illustrates graphical representation of the warm pressing configuration used to fully consolidate the highly loaded extrudates (a) which shows the different components used and b) an actual photograph of a CNF/CMC extrudate before hot pressing.

The ~61 cm long wet extrudates were cut into smaller ~116 mm long segments. Subsequently two smaller segments were sandwiched between two stainless steel meshes and two silicone sheets (FIG. 11) and warm pressed at a temperature of 126° C. for 30 minutes using a hydraulic heated laboratory press model No. 3690 (Carver). After drying, tensile test dogbones were cut from the sheets in the machine direction (MD) following ASTM D638. The total dogbone length was 92 mm with a neck width of 4.80 mm and a gauge length of 26.40 mm. The dogbones were cut using a laser cutter (Muse Desktop Laser, Full Spectrum LASER, Las Vegas, NV) equipped with a 10.6 µm $CO_2$ 40 W laser. One to three passes (varied based on solids content of the paste) at 35% power and 100% speed were used to cut the samples and reduce damage. For sample conditioning, the cut samples were placed in a desiccator at ~25% RH for at least 2 days before mechanical testing. Dogbones were tested in tension using an electromechanical testing machine (MTS Insight) equipped with a 2000N load cell and serrated film clamps. To avoid sample slippage during testing, sandpaper was added at the grips. For all samples tested, a preload force of 1 N was applied. The crosshead speed was set to 1 mm/min. The ambient humidity could not be controlled and varied between 30% RH to 50% RH, yet large batches of samples (6 to 24 samples) were tensile tested on the same day to reduce variation amongst data sets. Once tested, the ultimate stress or strength (MPa) and strain to failure (%) were taken from the last data point collected. Young's modulus was determined through the steepest slope method. Strain was measured based on crosshead displacement without the use of an extensometer. The obtained mechanical testing data was collected by the built-in software (TestWorks4®). Grip compliance was measured using a thick 1020 steel specimen and sample data was adjusted accordingly. For density measurement, smaller 8 mm by 8 mm specimens were cut from the same sheet as the dogbones. A caliper and micrometer were used to measure the width and thickness of the squares while the mass was measured using an analytical balance (VWR™).

Lastly, cast CNF films were cut with the same laser cutter but with a reduced 25% power and a single pass. The dogbone specimens were smaller (37 mm long, a neck width of 1 mm, and a gauge length of 6.50 mm) yet still followed ASTM D638 (type IV). The specimens were tested using a dynamic mechanical analyzer (DMA) model Q800 from TA® Instruments (TA Instruments Inc., Wood Dale, IL). A strain-controlled mode used with a preload force of 0.010N and a strain rate of 0.5 mm/min until failure. Samples were tested at 35% RH.

Thermogravimetric Analysis (TGA)

Thermogravimetric analysis was performed using a thermogravimetric analyzer (TGA) model Q50 from TA®Instruments (TA Instruments Inc., Wood Dale, IL). Roughly 40 to 50 mg of the cast CNF, or warm pressed extrudates were loaded into a platinum pan. Prior to testing all the samples were preconditioned for over a week at 25% RH. Samples were tested from a temperature of 25° C. to 300° C. at a heating rate 10° C./min in an oxygen atmosphere.

Scanning Electron Microscopy (SEM)

Fractured surfaces of the tensile tested specimens were imaged using a Quanta 650 FEG field emission electron microscope. The fractured surfaces were positioned normal to the aluminum stub and secured using carbon tape. The samples were sputter coated (SPI sputter coater) with a platinum-gold target for 60 seconds. No polishing or sanding was used. Samples were imaged at 4 KeV and a spot size of 4. The working distance varied between 9 to 10 mm for highest resolution.

Statistical Analysis for Mechanical Testing

Unless otherwise stated 6 sample units were tested for each CNF/processing aid paste sample shown in the bar graphs. The laser cut specimens were visually inspected for any excessive burn marks or surface defects before performing mechanical testing. Only those with excessive defects or any edge burn marks were removed from the sample set. Additional samples were processed to account for any removed sample unit in a sample set. Statistical analysis was performed using OriginPro™. The error bars shown represent one standard deviation (STD) away from the mean value for the data set. A normality test was performed on the data sets to verify a normal distribution followed by a Student's t-test (95% confidence interval) to determine statistical similarity/difference among data sets.

Results and Discussion

Extrusion of Pure CNF and Processing Aid Selection

With the primary goal of processing 100% pure CNF sheets, initial attempts to extrude CNF were performed without the use of any processing aid. Extrusion of pure CNF was assessed at six different solids concentrations; 3.1, 10, 17, 20, 24, and 30 wt. % and at two different extrusion temperatures (i.e. 25° C. and 90° C. processing temperatures). Results show that pure CNF pastes with a solids concentration of 3.1, 10, 17, 20, and 24 wt. % all experienced significant amounts of dewatering. The dewatering raised the total solids concentration of the pastes to roughly ~85 wt. % which clogged the slot die and stopped the process. The increased solids loading easily raised the die pressures to the extruder's maximum limitation of ~ 69 MPa (10,000 psi). Furthermore, due to the lack of drainage/solvent ports in the barrel, the extracted water traveled opposite to the extrusion direction and pooled in the hopper region. The pooling of water caused rehydration of the newly fed material which was unable to push the dewatered material (~85 wt. %) at the slot die. On the other hand, CNF at ~30 wt. % also experienced dewatering yet to a much lower extent and was capable of being extruded into a ~330 mm (13 inch) long sheet (FIG. 1).

Extrusion of the 30 wt. % CNF was likely due to the greater water-retention ability of the CNF which reduced both pooling in the hopper and water adsorption/hydration (i.e. it was much harder for CNF to lose or gain water throughout the extrusion process). The increased water retention in cellulose is a phenomenon commonly seen in the papermaking industry were drying rates significantly decrease as the paper web dries. During drying, the paper web experiences permanent structural changes (e.g., hornification) due to the formation of fibril-fibril bonds and a reduction of pore size making for a tortuous path of escape for water. For pure CNF at 30 wt. % it appears that a higher water-retention ability facilitated processability as it was the only paste that did not significantly dewater. On the other hand, hornification could have also restricted the ability of the CNF to reform hydrogen bonds and homogenize (i.e. re-take shape) once the conveyed material reached the slot die for forming. The inability to retake shape after exiting the die caused an excessive amount of agglomeration/inhomogeneity in the sheet, which made the structure very fragile. Permanent hornification is a problem that has been present in paper recycling where the mechanical properties are reduced due to the irreversible hornification processes and mechanical, and chemical treatments must be used to partly restore the properties. For pure CNF a lower solids concentration could possibly be needed for forming and homogenization (i.e. fiber swelling) to occur during extrusion. Additionally, for all CNF loadings assessed, using higher processing temperatures of 90° C. seemed to exacerbate all the problems seen for lower processing temperatures 25° C. Hence, all subsequent extrusions were done using the lower processing temperature of 25° C.

Due to the prevailing problems during extrusion of pure CNF, a processing aid was desired to address dewatering. Thickeners, viscosifiers, and gelling agents have been used to viscosify suspensions and could serve to aid water retention. Table 2 below shows the selected candidates as well as the surface charge and acronym which will be used throughout the report.

TABLE 2

Thickeners, viscosifiers, and gelling agents assessed based on their water-retention ability when incorporated into a CNF slurry. All the selected processing aids are soluble in water at room temperature conditions. Processing aids suspensions which did not experience any perceivable water separation after centrifugation are marked with (*).

| Processing Aid | Charge at pH 6-7 | Acronym |
| --- | --- | --- |
| Methyl cellulose | Nonionic | MC |
| Hydroxyethyl methyl cellulose | Nonionic | HEMC |
| Hydroxyethyl cellulose | Nonionic | HEC |
| Guar gum | Nonionic | GG |
| Konjac glucomannan | Nonionic | KM |
| Amphoteric starch | + & − | AS |
| Cationic starch | + | CS |
| Poly(ethyleneimine) | + | PEI |
| Polyacrylic acid sodium salt | − | PAA |
| Carrageenan-lambda | − | CG-λ |
| Carbopol 940 | − | CP940 |
| Tragancanth gum | − | TG |
| Carboxymethyl cellulose sodium salt* | − | CMC |
| Xanthan gum* | − | XG |
| Anionic polyacrylamide* | − | aPAM |

*processing aids which fully suppressed water separation

As a first approach, water-retention ability of the suspensions containing viscosifiers was assessed through centrifugation. This approach is essentially an accelerated separation column test which bypasses particle diffusion and hence the long wait times associated with standard gravity separation. Additionally, if separation occurs at the pressures associated with the centrifugal forces, as they are not as high as in an extruder, indicate that a processing aid will not be suitable. Centrifugation showed that suspensions containing CMC, XG, or aPAM at a dry weight ratio of 0.1:1 aid to CNF did not experience any perceivable water separation or solid-liquid separation. All the other suspensions (not marked with an asterisk, Table 2) experienced a slight level of dewatering (~2 to 3 ml of water extracted; MC, HEMC, HEC, GG, CG-λ, CP940, and TG) or had a similar water separation behavior to pure CNF (~20 ml of water separated; KM, AS, CS, PEI, and PAA). Similar results are produced for suspensions with a reduced ratio of processing aid to CNF of 0.05:1, where CMC, XG, and aPAM containing suspensions did not dewater, yet all other suspensions experienced dewatering to an even greater extent. Additionally, processing aids like KM formed irreversible gels when mixed with water which could not be fully incorporated into CNF hence KM was not further studied. The water retention provided by CMC, XG, and aPAM could not necessarily be linked to the surface charge as other negatively surface charged polymers did not suppress dewatering to the same extent (e.g. TG, CP940, CG-λ, and PAA). Similarly, water retention could not be directly linked to molecular weight ($M_w$) as CMC containing suspensions did not dewater and had a much lower $M_w$ (~150,000 to 180,000) when compared to XG ($M_w$~300,000 to $7.5*10^6$), aPAM (in the millions), or even to CP940 ($M_w$~$7*10^5$ to $4*10^9$) which did dewater.

Figure 2:
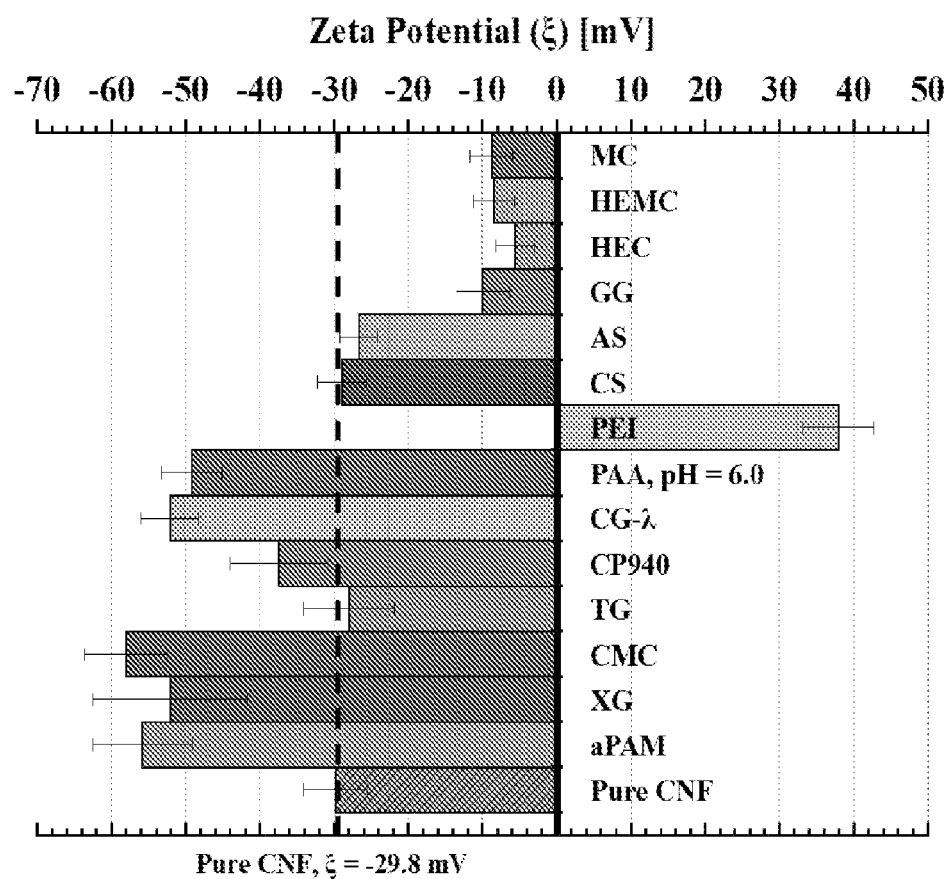
FIG. 2 illustrates Zeta potential of pure CNF and suspensions of CNF plus processing aids. The dashed line shown is referenced to the mean of the pure CNF zeta potential ($\xi$=−29.8 mV). Six measurements were performed for each case and the average was calculated. The error bars represent one standard deviation away from the mean. The pH of all the samples was measured to be 6.4 except for PAA that had a pH of 6.0.

In order to further gauge the stability of the centrifuged suspensions and possibly explain the water retention behavior, zeta potential was measured on dilute suspensions of CNF plus processing aid. The results showed that CMC, XG, aPAM, CP940, CG-λ, and PAA containing suspensions experienced the lowest zeta potential (i.e. largest magnitude of charge). CMC, XG, aPAM, and CG-λ all lowered the zeta potential below −50 mV with the strongest reduction being caused by CMC ($\xi$=−58±5.63 mV). This represents a relatively large increase in stability when compared to pure CNF ($\xi$=−29.8±4.35) which tends to phase separate at room temperature conditions and without any centrifugation. Aids like TG, CS, and AS did not have any effect on the zeta potential when compared to pure CNF, while HEC, MC, and HEMC all increased it towards zero, hence theoretically reducing stability (FIG. 2). Zeta potential results matched with the centrifugation behavior seen for CMC, XG, and aPAM indicating that colloidal stability is the origin of dewatering results. However, this supposition did not match for other processing aids. For example, MC, HEMC, HEC, and GG containing suspensions experienced the same low level of dewatering as those containing CG-λ ($\xi$=−52.1±3.83 mV), and CP940 ($\xi$=−37.4±6.59 mV) when compared against pure CNF. Furthermore, the PAA containing suspension ($\xi$=−49.2±4.09 mV), experienced the same dewatering behavior as pure CNF. Additionally, strongly positively charged polymers like PEI flipped the sign of the zeta potential yet did not provide water retention during centrifugation trials. Hence, zeta potential cannot directly explain the dewatering behavior of CNF/aid suspensions yet can still serve as a first approximation. Lastly, it is important to point out that while it is indeed possible to achieve no water separation during centrifugation for the slightly dewatering suspensions (i.e. those that contain MC, HEMC, HEC, GG, CG-λ, CP940, or TG) by adding more polymer (e.g. a ratio of 0.15:1 or 0.2:1, aid:CNF) the intent in this work is to produce extruded sheets with the highest CNF purity. Hence, only CMC, XG, and aPAM were selected for further study.

Extrusion of CNF/CMC, CNF/XG, and CNF/aPAM Pastes

Based on an initial extrusion trial of three different solids loadings (~3, ~7.6, and ~15 wt. %) of a CNF/CMC paste (0.1:1 of aid to CNF), it was determined that a total solids concentration of ~15 wt. % is needed to form cohesive sheets. Lower solids concentration would extrude yet the extrudate was too watery and not cohesive enough to be transported or handled. Based on the results, ~15 wt. % total solids concentration was selected for all extrusion pastes unless otherwise stated.

To achieve a ~15 wt. % concentration, the watery suspensions (~3 wt. %) had to be air dried for roughly 38 days, which is not industrially viable. These long drying times are caused by the enhanced water retention brought by the processing aids and has been known to reduce drainage in typical papermaking. Due to the enhanced water retention, typical dewatering/drying techniques often used to consolidate pure CNF such as vacuum filtration, mechanical pressing, and oven drying cannot effectively extract water from CNF/aid pastes. To circumvent the long drying times, concentrated pastes containing CMC, XG, and aPAM were prepared by using a standard polymer Banbury-style high shear mixer, the procedure for which is explained in detail in the experimental section. The high shear mixing process utilized a bottom up approach to achieve the higher solids loadings by using vendor pre-dewatered pure CNF (~23 wt. % instead of the ~3 wt. % slurry). The needed processing aid and water were then added to tune the final solids concentration. In the literature, a similar approach was used to produce ultra-high consistency pulp/biomass pastes (20 to 40 wt. %) with the addition of processing aids or water soluble polymers (WSP) like CMC, HPMC, XG, agar, HPC, and others. Out of all the WSP sampled, CMC was found to provide highest paste stability while HPMC provided a thermo-reversible aspect which could be important for downstream dewatering after sheet forming. Thus, this mixing process can save many days that would otherwise be required for air drying.

Figure 3:
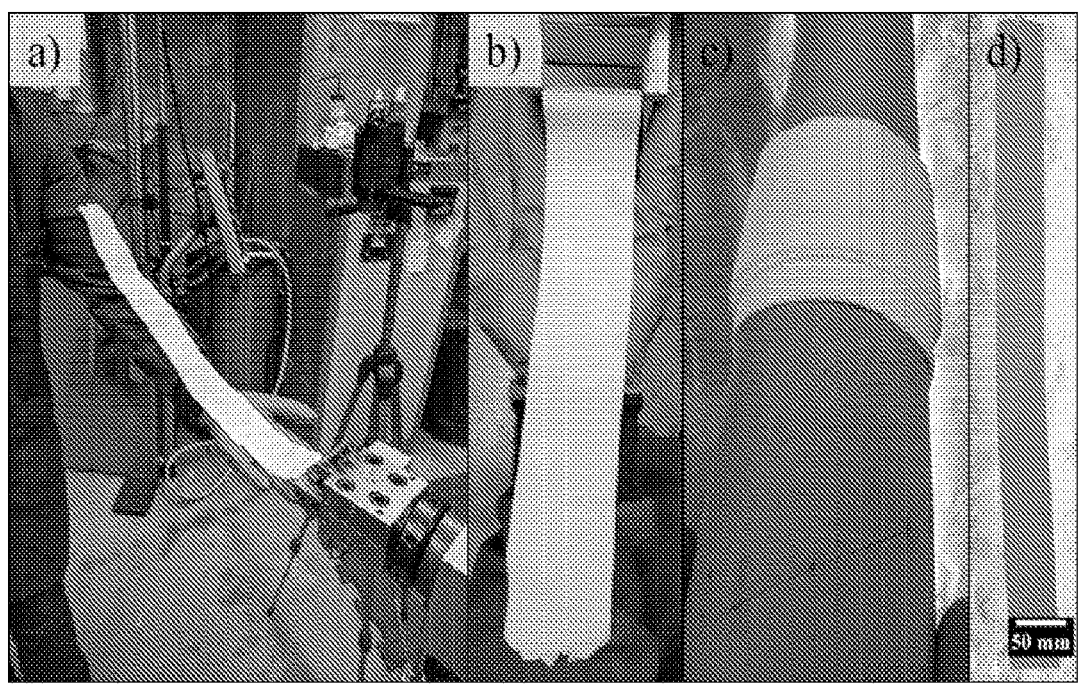
FIG. 3 illustrates wet CNF/CMC sheet single screw extrusion (a), wet CNF/CMC extrudate (~15 wt. % total solids) exiting the rectangular sheet die (b), extrudate collected on a cardboard roll (c), and de-rolled extrudate laid flat on top of aluminum foil (d).

Extrusion of CNF/CMC (0.05:1 of aid to CNF), CNF/XG (0.05:1), or CNF/aPAM (0.013:1) pastes failed due to dewatering at the slot die and did not form homogenous sheets. This shows that while centrifuging is a good initial screening test for processing aids (e.g., a list of 15 candidates was reduced to 3, Table 2, it clearly does not replicate the complex pressure profiles and shear forces in an extruder or the behavior of highly loaded pastes. On the other hand, CNF/CMC, CNF/XG pastes at 0.1:1 and aPAM pastes at 0.026:1 of aid to CNF did not dewater and were capable of being formed into wet sheets. Extrudates/sheets with an average length of 0.61 m (~2 ft), width of 5.1 cm (2 inches), and wet thickness of 1.46±0.05 mm were processed for each paste type, CNF/CMC, CNF/XG, and CNF/aPAM (FIG. 3). It is important to note that the length of the extrudate was only limited by the amount of material at hand and by the lack of collection rolls, hence longer extrudates can be produced if needed.

Figure 12:
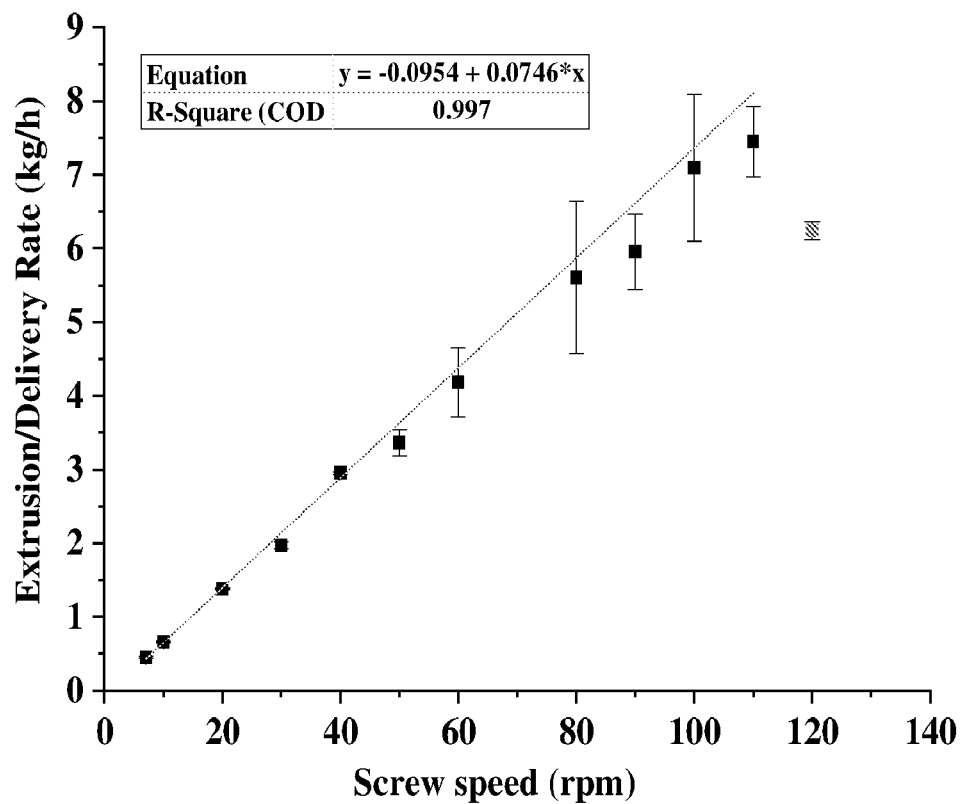
FIG. 12 illustrates extrusion delivery rate [kg/h] verses screw speed [rpm] for a CNF/CMC paste with a dry weight ratio of 0.1:1. Three aliquots of material were collected for each data point. The weight of the sample and delivery time were recorded in real time. A linear fit was applied to the data showing a strong correlation between the two variables ($R^2$=0.997). The red dot was excluded from the analysis for reasons explained in the main report. The error bars represent 1 standard deviation away from the mean.

Wet sheet production rates at a screw speed of 7 rpm were in the range of 0.45±0.02 kg/h (or 0.07±0.002 kg/h dry) while the maximum possible production rate was found to be 7.45±0.47 kg/h (or 1.14±0.072 dry) at a screw speed of 110 rpm for CNF/CMC pastes (~15.32 wt. % solids). FIG. 12 shows a plot of the production rate (kg/h) verses screw speed (rpm) for a CNF/CMC (0.1:1 of aid to CNF) paste at ~15 wt. %. There was a strong ($R^2$=0.997) linear relationship between the extrusion/delivery rate and the screw speed until the maximum screw speed (120 rpm) was reached, which experienced a decrease in the rate to 6.24±0.12 kg/h (0.96±0.02 kg/h dry). The reduction of the delivery rate could possibly be caused by the shear thinning response of the paste. If the shear is high enough to cause shear thinning of the material pressed against the barrel walls the screw's ability to deliver material to the slot die will be hindered. Hence, it is expected that the maximum possible production rates will depend on both the processing aid type and the total solids concentration as the rheological response will change (as seen in the next section). The obtained processing rates are much lower than typical industrial single-screw extrusion lines with a throughput of approximately 40 kg/h at 122 rpm, yet current efforts only employ a laboratory scale extruder with a relatively small barrel diameter (1.9 cm) and small width (5.1 cm) sheet die. It is also important to point out that at all the screw speeds there was no 'sharkskin' nor ridged pattern observed at the extrudate's surface. It is possible that the lubricating water layer or depletion layer that forms between two phase materials and solid surfaces suppressed the stick-slip behavior common in capillary dies. On the other hand, a small amount of die swell was observed as the extrudates were on average slightly thickener (1.46±0.05 mm) than the set die gap width (1.13 mm).

When comparing wet extrudates it was found that CNF/CMC extrudates were the most homogenous and contained no perceivable surface or bulk defects such as pinholes, aggregation, inhomogeneity, etc. (FIG. 4a). CNF/XG extrudates contained pin holes and agglomerated structures while CNF/aPAM extrudates contained numerous defects (FIG. 4b, 4c). Collectively, for all wet extrudates, larger defects were partly transferred to the fully dry state after pressing and heating (FIG. 4g-4i), which ultimately lead to lower mechanical performance as shown in the mechanical testing section. Additionally, similar defect patterns were observed inside of the sheet die after extrusion and during cleaning.

Rheological Analysis of Pure CNF, CNF/CMC, CNF/XG, and CNF/PAM Pastes

Rheological analysis of highly concentrated pastes was carried out on a Brabender torque rheometer. The measured viscosity-temperature sensitivity constants (b, used to correct the measured torque data), were measured for each blend and are shown in Table 3. From here the torque and roller speed were converted to viscosity and shear rate through the Equations 1-3 and plotted in FIG. 5.

TABLE 3

Paste concentrations and rheological constants obtained from torque rheometry analysis. A dry weight ratio of 0.1:1 (aid:CNF) was used for all pastes.

| Paste Type | Total solids [wt. %] | Aids [wt. %] | CNF [wt. %] | $H_2O$ [wt. %] | b [° $C.^{-1}$] | $R^2$ | n | log (m) | $R^2$ |
|---|---|---|---|---|---|---|---|---|---|
| Pure CNF | 15.32 | 0 | 15.32 | 84.68 | 0.0085 | 0.944 | 0.13 | 3.533 | 1.000 |
|  | 30 | 0 | 30 | 70 | 0.0145 | 0.982 | 0.06 | 4.470 | 1.000 |
| CNF/CMC | 15.32 | 1.39 | 13.93 | 84.68 | 0.0119 | 0.941 | 0.42 | 2.991 | 0.995 |
|  | 19 | 1.73 | 17.27 | 81 | 0.0107 | 0.963 | 0.30 | 3.359 | 0.998 |
|  | 25 | 2.27 | 22.72 | 75 | 0.0040 | 0.729 | 0.26 | 3.494 | 0.999 |
| CNF/XG | 15.32 | 1.39 | 13.93 | 84.68 | 0.0049 | 0.722 | −0.31 | 3.666 | 0.982 |

Figure 4:
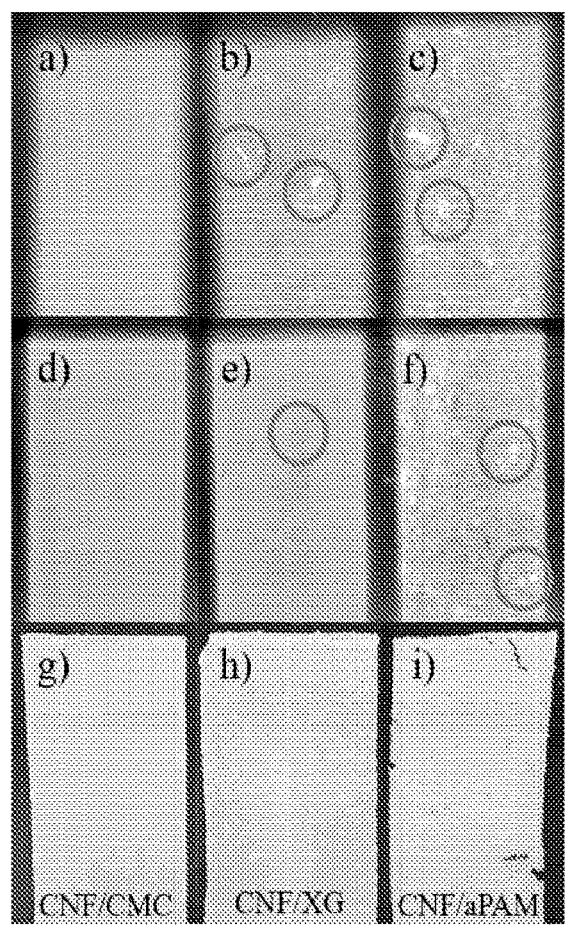
FIG. 4 illustrates wet extrudates of CNF/CMC (a), CNF/XG (b), CNF/aPAM (c) pastes at ~15 wt. %, pressed and heated to fully dry sheets of CNF/CMC (d, g), CNF/XG (e, h), and CNF/aPAM (f, i). A strong back light was used to illuminate samples and highlight the defects like aggregation/aggregates or pinholes. A few of the observed defects are circled in red. FIGS. (a) through (f) were set to a grey scale to better appreciate the defects while FIGS. (g), (h), and (i) were not color modified. The width of the sheets was ~51 mm.
Figure 5:
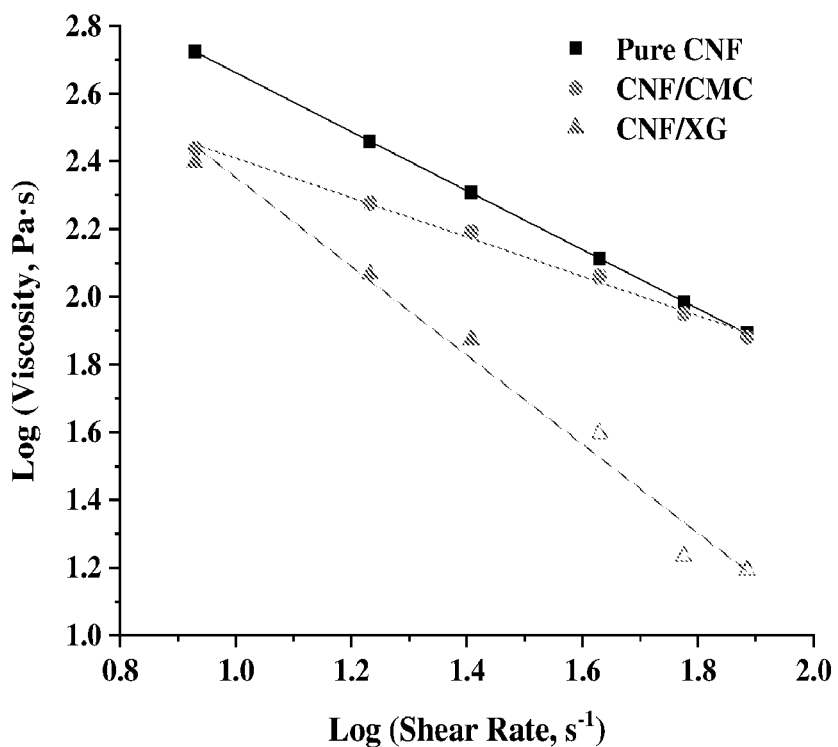
FIG. 5 illustrates Log (viscosity)–log (shear rate) dependence of pure CNF, CNF/CMC, and CNF/XG pastes with an aid to CNF ratio of 0.1:1 measured on the torque rheometer at 28° C. The power law index is calculated by n=(slope+1) while the consistency index is the intercept point. All the analyzed pastes and pure CNF had a solids concentration of ~15.32 wt. %. Unfilled points represent unreliable data due to slipping or sticking to the mixing blades.

FIG. 5 shows the log(viscosity) dependence on log(shear rate) at 28° C. for 15.32 wt. % pastes containing CMC, XG, aPAM, and pure CNF. The solid lines correspond to linear curve fits with all $R^2$>0.98. The power law index (or shear thinning exponent, n) and melt consistency index (m) were calculated from the power law fits and are shown in Table 3. FIG. 5 and the values in Table 3 show that the addition of CMC suppressed the shear thinning behavior when compared to pure CNF. The power law index increased from n=0.13 for pure CNF to n=0.42 for CNF/CMC at ~15.32 wt. %. For the CNF/XG paste, issues due to slippage at the mixing blades started to occur at ~50 to 70 rpm (data points are not filled in to signify unreliable data, FIG. 5) and hence the power law and consistency index could not be reliably calculated or compared (note n is negative, Table 3, FIG. 5). Slippage was most likely caused by XG's highly shear thinning rheological behavior when compared to other thickeners. This behavior is possibly caused by the weak association between XG molecules and their relatively stiff conformation. XG molecules take on a stiff right-hand five-fold helical conformation with a large hydrodynamic size and with a persistence length, q >100 nm. This is in contrast to more flexible linear molecules like CMC or Guar gum (q~10-30 nm) that take on a ribbon-like conformation and are also characterized by a pseudoplastic behavior. XG's conformation allows for higher viscosities at lower shear rates. Slippage also occurred for CNF/aPAM, yet in a more significant manner at lower rpms (≤5 rpm). Hence, CNF/aPAM could not be characterized using the Brabender. One rheological study showed that adding trace amounts (10 g/m³) of aPAM to paper pulp highly increased the elongational viscosity and drainage time while keeping the shear viscosity the same. Perhaps for the CNF/aPAM pastes prepared for extrusion (~15.32 wt. % total solids with a ratio aid to CNF of 0.026:1), the high aPAM concentration (~4500 g/m³) could have influenced the shear viscosity as it does the elongational viscosity for trace amounts in dilute suspensions, thus exacerbating slippage. When compared to the extrudates (FIG. 4) it appears that pastes with a reduced shear thinning behavior or more Newtonian behavior present less defects and hence have a greater sheet homogeneity. For the prepared pastes, CMC appears to impart both good rheological properties and strong dispersion to CNF pastes.

For all shear rates studied and for both processing aids added (CMC and XG), there was a marked decrease of the apparent viscosity of the pastes when compared to pure CNF (FIG. 5). Classically in synthetic polymer extrusion, the same effect is caused by processing aids that act as internal lubricants. For example, polyglycerol ester ($C_{16}$ to $C_{22}$) fatty acid are added to reduce the characteristic high melt viscosity of poly(vinyl chloride), poly(propylene), or acrylonitrile-butadiene-styrene. For CNF/aid pastes the decrease in viscosity is possibly caused by the reduction of fibril-fibril contacts and fibril-fibril friction as the dispersed/dissolved polymer molecules adsorb to fibrils and improve dispersion. More specifically for CMC, the frictional reduction and dispersion effects has been studied extensively for more dilute papermaking suspensions (1 to 3 wt. % total solids) that contain CMC as a wet-end additive in the dispersed phase or adsorbed CMC onto the pulp fibers. Because CNFs have the same surface chemistry as bleached kraft pulp often used in papermaking suspensions it is believed that the reported effects were carried over to the extrusion pastes. Contrary to CMC, XG has not been studied as an additive in papermaking suspensions yet similar effects could be occurring in terms of fibril-fibril friction and contact reduction as well as adsorption. Samaniuk et. al. studied the change of the rheological response and yield stress of high consistency biomass corn stover pastes (~25 wt. % or higher) with the addition of aPAM, XG, and CMC. The results show that the yield stress of the pastes decreased at least by 60% with the addition of CMC and a similar behavior was also seen for XG and aPAM.

Typical rotational shear rate controlled rheometry with a cup and bob fixture served as a secondary analysis/comparison and was performed on very dilute suspensions (1 wt. %) of CNF/CMC, CNF/XG, CNF/aPAM, and pure CNF due to the high viscosity of highly-loaded suspensions making them unmeasurable in our system. The obtained trends for the very dilute suspensions match those obtained for the highly loaded pastes (~15 wt. %) evaluated on the Brabender. Where adding CMC reduced the shear thinning behavior (n=0.11 for pure CNF, and n=0.30 for CNF/CMC). In contrast to the torque rheometer analysis, CNF/XG and CNF/aPAM watery suspensions could be analyzed without slippage. The behavior of CNF/XG and CNF/aPAM was similar in that both suppressed the shear thinning behavior (n=0.26 for CNF/XG and n=0.24 for CNF/aPAM) when compared to pure CNF. The apparent viscosity of CNF/XG and CNF/aPAM was also lower than that of CNF/CMC at all shear rates studied. Interestingly, a power law transition in pure CNF at ~5 s-1 disappeared with the addition of processing aids. While the reason is not clear, it is was deemed beyond the scope of this paper. It is also important to point out that these results only serve as indirect comparisons to the torque rheometer results and greater importance is given to highly loaded pastes as those are the concentrations desired for extrusion.

Figure 6:
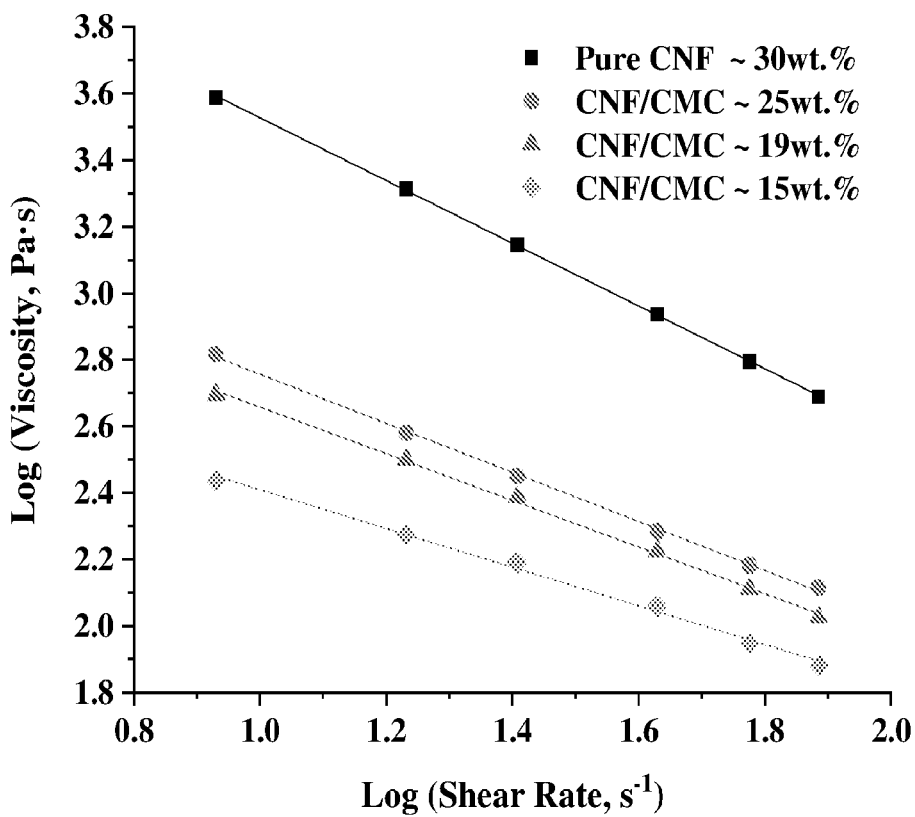
FIG. 6 illustrates Log (viscosity)–log (shear rate) dependence of CNF/CMC pastes with solids loading of ~15.32 wt. %, ~19 wt. %, and ~25 wt. % and pure CNF with a solids loading of ~30 wt. % measured on a torque rheometer at 28° C. The processing aid to CNF ratio for the evaluated pastes was 0.1:1 (dry weight).

Additional analysis, using the torque rheometer, of the two higher concentration ~19 wt. % and ~25 wt. % CNF/CMC pastes (at 0.1:1) showed that a higher total solids concentration reduced the power law index and hence increased the shear thinning response (n=0.42 for ~15 wt. %, n=0.3 for ~19 wt. %, and n=0.26 for ~25 wt. %, FIG. 6 and Table 2). As expected, there is also a general trend where higher solids concentration leads to higher apparent viscosities for all shear rates probed due to the higher density of particle interactions. It is important to note that the only "successful" extrudate of pure CNF at ~30 wt. % showed an order of magnitude higher viscosities when compared to ~25 wt. % CNF/CMC, and a stronger shear thinning behavior (n=0.06) when compared to the ~15 wt. % pure CNF paste (n=0.13). It is also important to point out that while testing pure CNF samples (~15 and ~30 wt. %) slight dewatering occurred, which might have affected the rheological response, this was not quantified as the amount of water lost as a result of coating the surfaces of the mixer.

Figure 7:
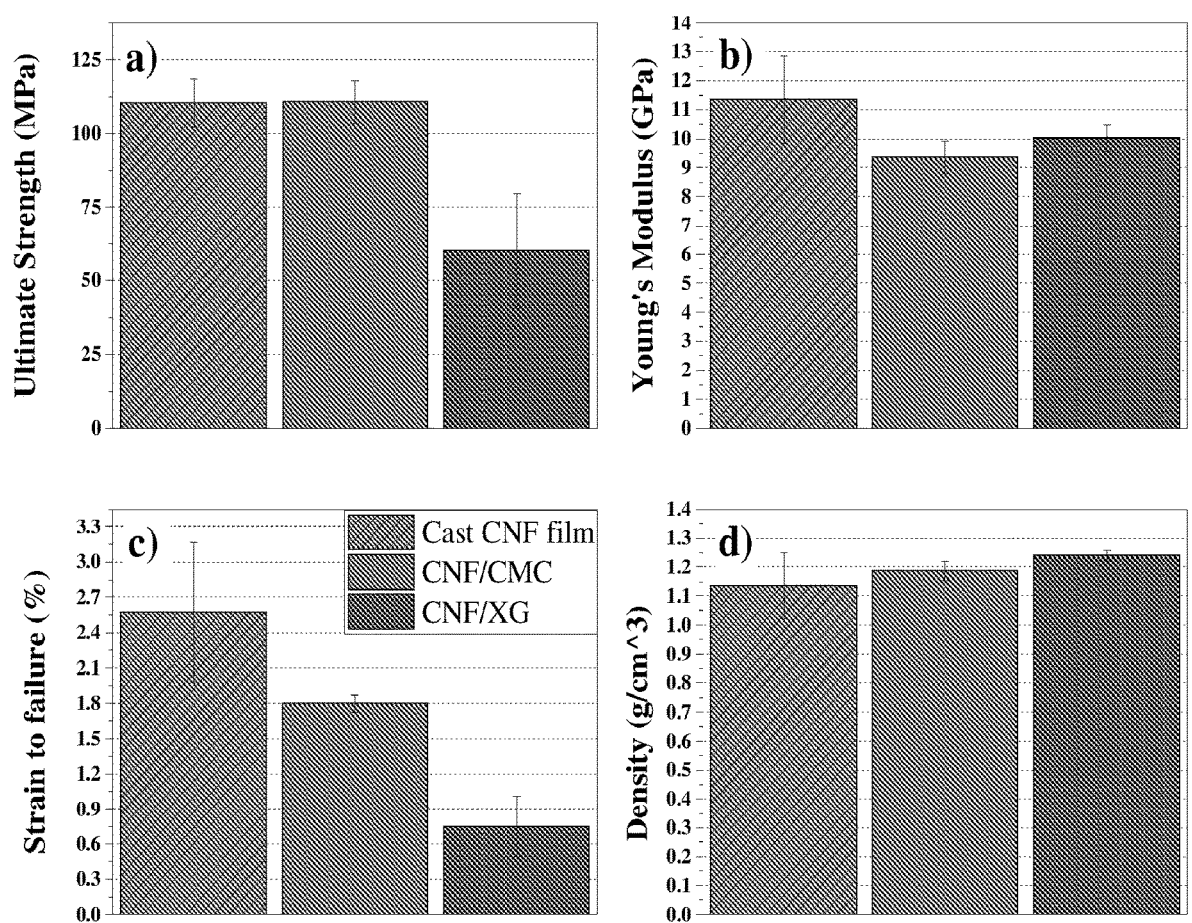
FIG. 7 illustrates tensile mechanical response of cast CNF films, extruded CNF/CMC sheets, and extruded CNF/XG sheets with a processing aid to CNF ratio of 0.1:1. The error bars represent one standard deviation away from the mean.

Mechanical and Thermogravimetric Analysis of CNF/CMC, CNF/XG, and CNF/aPAM Sheets Mechanical testing of the pressed and dried extrudates with an aid to CNF dry weight ratio of 0.1:1 showed that CNF/CMC sheets outperformed CNF/XG sheets in terms of ultimate strength (110.6±7.30 MPa and 60.1±19.5 MPa, respectively) and strain to failure (1.80±0.08% and 0.75±0.26%, respectively) as shown in FIG. 7a, c. These results were not surprising as CNF/XG sheets contained more defects than CNF/CMC sheets (FIG. 4). The CNF/aPAM sheets were not tested mechanically, because the properties are expected to be much lower when compared to any of the other extruded sheets due to the significantly higher level of defects, (FIG. 4). Surprisingly, the density for CNF/XG sheets (1.24±0.02 g/m³) was higher than CNF/CMC sheets (1.19±0.03 g/m³) and cast CNF films (1.13±0.11 g/m³) (FIG. 7d).

Figure 10:
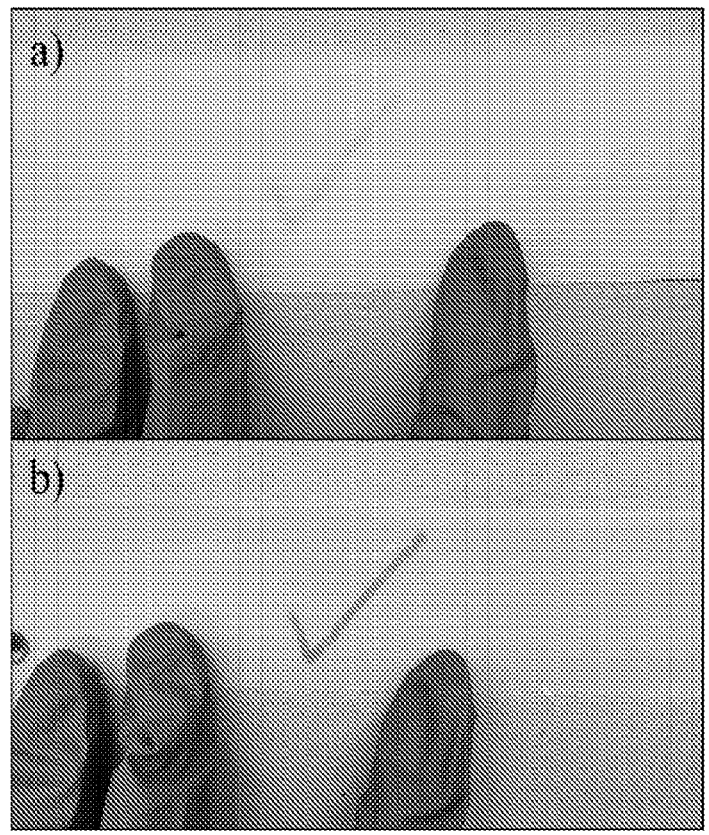
FIG. 10 illustrates two different consolidation procedures used to fully dry an extruded CNF/CMC paste through pressing and heating (a) and heated calendering (b). Note that the check mark can be viewed more easily with the calendered sheet.

When compared against cast CNF films prepared through typical solution casting, the extruded CNF/CMC sheets were statistically the same in terms of ultimate strength (110±8.2 MPa for cast CNF films verses 110.6±7.30 MPa for extruded CNF/CMC sheets) and density (1.13±0.11 g/m³ for cast CNF films verses 1.19±0.03 g/m³ for CNF/CMC). Collectively, for both CNF/CMC and CNF/XG, the extruded sheet's strain to failure was lower than that of cast CNF films (2.57±0.6%), yet this is probably an artifact of the constrained drying applied to the extruded sheets verses the room temperature unconstrained/free drying used for cast films. In terms of Young's modulus, all the extruded sheets were statistically similar to cast CNF films (FIG. 7b). SEM analysis of the extruded sheets and cast CNF film did not reveal any additional information. All the tested sheets and films presented a paper-like layered structure with fibrils pointing towards the tensile direction. The fractured surfaces looked similar to previous work on thicker multi-layered neat CNF sheets. Furthermore, preliminary attempts at calendering of the wet extrudates of CNF/CMC showed that full extrudate consolidation can be achieved and a more translucent sheet is developed (FIG. 10). The mechanical properties of the calendered sheets were not evaluated, but a higher density is expected.

Higher processing aid concentrations were also probed in order to better gauge the effect of the processing aid on the mechanical properties. The results showed that adding CMC at a ratio of 0.15:1 (aid to CNF) lowered all the mechanical properties, possibly due to over plasticization. Surprisingly, the addition of XG at a ratio of 0.15:1 (aid to CNF) improved all the mechanical properties when compared to pressed sheets with a XG to CNF ratio of 0.1:1. The addition of more XG appeared to reduce macroscopic defects like pinholes and aggregates possibly due to improved CNF dispersion. A comparison between CNF/CMC and CNF/XG both with a ratio of 0.15:1 was also made which shows the marked increase for CNF/XG sheets.

Thermogravimetric analysis (TGA) of the pressed and heated extrudates revealed a similar degradation behavior between CNF/aPAM and the ~30 wt. % pure CNF extrudate with a pronounced weight loss reaching over 2% at 100° C. On the other hand, CNF/CMC and CNF/XG sheets behaved more like cast CNF films with a less pronounced weight loss reaching 1% at 100° C. For all cases, the weight loss could be linked to how well the material retains water as there is always some amount of free and bound water left and CNF starts degrading at 180° C. while aids like CMC start degrading at 200° C. CMC and XG could have acted as a stronger CNF dispersant and thus enabled more surface area making it harder for water to defuse and escape through a more homogenous structure. This is in contrast to CNF/aPAM and pure extruded CNF sheets whose structure looked heavily agglomerated even in the macroscopic state (FIG. 1 and FIG. 4f). Examples in literature for this water retention behavior can be seen between the more agglomerate fibrillar nature of CNF verses the highly dispersed TEMPO oxidized CNF (TOCNF) fibrils. The higher fibrillar dispersion of TOCNF makes for much stronger and more viscous gels which binds or retains water more strongly. Furthermore, cast CNF films achieve a good level of homogeneity as the drying process is very slow compared to pressing which allows for CNF fibrils to find the best possible packing.

Figure 8:
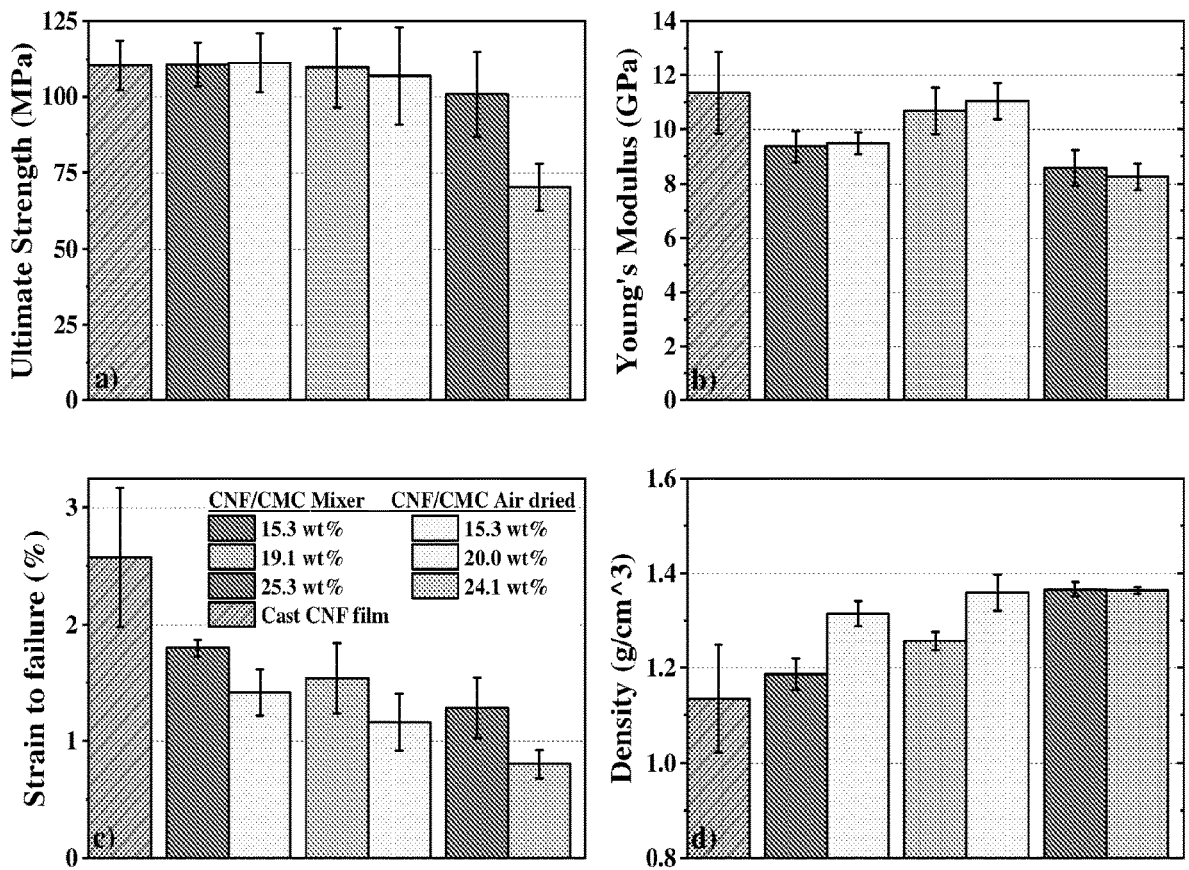
FIG. 8 illustrates Mechanical performance of Brabender mixed pastes (darker color) verses air dried pastes (lighter color) prepared using a humidity-controlled oven. The error bars represent one standard deviation away from the mean.

Validation of Brabender Mixing Procedure for Preparation of CNF/Processing Aid Pastes To verify that the Brabender mixing method is not damaging the CNF fibrils and to show that it is an industrially viable high volume method for preparing pastes for extrusion, CNF/CMC pastes at three solids loadings (~15, ~19, and ~25 wt. %) were prepared, extruded, pressed and heated, and tested mechanically in tension. These "mixer-pastes" were compared against air-dried pastes "AD-pastes" with roughly the same solids concentration. The results show that the ultimate strength for ~15 wt. % and ~19 wt. % mixer-pastes is equivalent to AD-pastes, while at ~25 wt. % mixer-pastes outperformed AD-pastes (ultimate strength of 101±14.12 MPa for mixer-pastes at ~25 wt. % verses 70±7.76 MPa for AD-pastes at 24 wt. %). In terms of strain to failure, mixer-pastes outperformed AD-pastes at all concentrations. It is plausible that the decrease in properties for AD-pastes is due to the uneven surface drying that incorporates microscopic aggregates into the sheets once extruded. Yet for both types of processes, the strain to failure decreases with an increase in solids concentration hence lower solids concentration might be optimal for extrusion of tougher sheets. Collectively for both types of pastes (mixer and AD), the density appears to increase as concentration increases and then plateaus at a value of $1.37 \pm 7.76$ g/m$^3$. Furthermore, the Young's modulus of the mixer-pastes and AD-pastes appear to be equivalent to each other at all probed concentrations. Surprisingly for both types of pastes, the modulus appears to vary between ~9 GPa to ~11 GPa as a function of concentration. The reason for the modulus fluctuations are unknown and will be investigated in future publications (FIG. 8).

In this work the processing of CNF sheets through conventional single screw extrusion was presented and assessed. Results showed that the problems associated with extrusion of pure CNF, such as, dewatering and aggregation were completely suppressed with the addition of processing aids like CMC, XG, and aPAM at low concentrations (~9 wt. % processing aid and 91 wt. % CNF both in dry weight equivalents) and that these processing aids can be added using standard polymer high shear mixing in a much faster and more controlled process than air-drying. Wet extrudates with an average length of 0.61 m (~2 ft), width of 5.1 cm (2 inches), and thickness of 1.46±0.05 mm were processed using a single screw extruder. The length of the extrudate was only limited by the amount of material at hand and by the lack of collection rolls. Out of the three processed paste types, CNF/CMC extrudates appeared to be the most homogenous and contained the least number of defects like aggregates and pinholes. This was possibly due to the stronger Newtonian rheological response of CNF/CMC (n=0.42) when compared against pure CNF (n=0.13). On the other hand, CNF/XG and CNF/aPAM extrudates contained more defects and developed a strong shear thinning response. After pressing and heating, tensile testing of the processed CNF/CMC extrudates revealed equivalent mechanical properties in terms of ultimate strength, density, and modulus when compared to cast CNF films prepared by typical solution casting. Additionally, calendering of the wet extrudates showed that full consolation can be achieved, which eliminates the need to use discrete pressing steps.

More broadly, the results obtained show that it is possible to utilize common polymer processing methods for CNF from beginning to end of the processing chain allowing the potential to significantly increase production rate and lower cost. Banbury high-shear mixing, extrusion and calendering provide an elegant way to both continuously process CNF and take advantage of the already developed polymer melt-processing industry, while at the same time, taking advantage of their relatively lower cost as compare to typical paper production methods. Though the work performed employed the use of a single screw extruder, it is envisioned that the use of other more advanced extruder configurations would add utility, such as twin screw extruders that can handle more viscous polymer melts allowing more concentrated CNF/aid pastes (above 25 wt. % total solids) or single screw extruders with mixing stages or twin-screw mixing extruders allowing continuous mixing of the processing aid in line with extrusion in a single step, as is performed commercially with polymer melts, currently.

Molding of CNF+CMC

While nanocellulose fibrils (CNF) exhibits desirable properties while also being eco-friendly and sustainable, there are some roadblocks that impede the proper commercialization of CNF products. For instance, flat CNF sheets have limited commercial applications and finding industrially scalable methods has become of main importance for the cellulose community. Our goal then, is to find existing industrial processing technologies where CNF mixtures can be integrated and processed into end products other than flat sheets. Due to the worldwide availability of polymer processing technologies, and the similarities between wetted CNF+CMC materials to melted polymers, it was only logical to look first at the most relevant polymer processing techniques in search for potential adaptabilities we could implement to process CNF. In our studies, it was evident that the conversion of polymers into final products involved three major production phases; the heating of the resin, shaping or forming under some constraint, and cooling to gain shape retention.

A good example of this is found in thermoforming. In this process, polymers usually rely on sheets that are previously extruded and are continuously fed through the molding system. Sheets are subjected to time and temperature for a period of time, allowing the material to flow, at which point the sheet is physically push into a number of cavities where it takes the form of preformed molds with or without the help of vacuum. The material is then subjected to a rapid cooling, and the molded part is cut and extracted. Thermoforming is one of the most highly used processes in the polymer industry and is usually cheap, fast, and ideal for the production of disposable products used in the food, medical and retail industries. Similarly, injection molding feeds material from an extruder directly to a mold, using temperature and pressure to facilitate the injection of the material to a cavity. The product is later cooled inside the mold. This process, although more complex, allows for more intricate shapes, better thickness control and a good reproducibility of the parts. A final and more direct example of molding technologies is compression molding, where polymeric material is placed in the middle of a heated mold, where it softens and is later press as the mold closes. While these explanations are overall simplistic and a lot of different parameters need to be controlled in both processes, it serves well to exemplify some of the most used polymer processing techniques around the world and gave bird to the idea of processing CNF+CMC mixtures in a similar fashion.

Similarly to compression molding, the molding of CNF materials is achieved by the introduction of a mixture of CNF+CMC into the desired mold and pressing. Since the CNF+CMC mixture is already wet, it can be molded without the need of any additional steps. In fact, the plasticization effect that humidity has on the CNF moldability is what allows this material to retain various shapes and forms. To finalize, the end product is subjected to temperature to achieve the removal of water of the composition and lock the desired shape, obtaining a biodegradable product that can target the substitution of petroleum derived polymers. This processing technique is unique in that is the first time a wetted sheet of high load CNF content has been molded into a complex shape, removing the necessity of humidifying previously dried films and allowing for a high range of forms. In the literature, the processing of highly loaded CNF materials into products other than sheets is scarce. In fact, only one previous work performed by Larsson et all. (2014) described the molding of an already dry CNF film. In their study, a dry film was first conditioned at 90% RH and then quickly sandwiched between two thin polyethylene films and pressed in a mold, achieving the formation of a double curved structure.

Materials and Methods

Different from the studies done by Larsson et al., where films were produced by solution casting, left to dry, then humified and later molded, (see Larsson, P. A.; Berglund, L. A.; Wågberg, L. Ductile All-Cellulose Nanocomposite Films Fabricated from Core-Shell Structured Cellulose Nanofibrils. *Biomacromolecules* 2014, 15 (6), 2218-2223. https//doi.org/10.1021/bm500360c), our efforts are focused on using wet CNF by controlling CNF rheology to obtain a polymer-melt like "putty" consistency. This is done by mixing CNF with CMC in polymer-style high shear mixer (e.g. Bunbury), or compounding extruder. In such a way, either two step (material mixing and then subsequent molding) or continuous production (extruder fed molding) of CNF+CMC molded products. This process can then be analogous to common industrial practice where the same basic machinery is used to melt solid polymers is in discontinuous processes such as compression molding and thermoforming and in semi-continuous processes such as injection molding where extrusion is used to feed the molding operation as the rheology needed for each process is similar[5]. Thus, the previous ability to mix CNF with CMC in a polymer-style process to achieve a rheology necessary for extrusion also enables molding such as compression and injection molding.

Materials. Carboxymethyl cellulose sodium salt powder (e.g., CMC) was purchased from Alfa Aesar (Lot #R07E012, D.S 0.69, η=660 mPa·s at 1% v/v at 25° C., Mw ~150,000 to 180,000). Mechanically fibrillated CNFs produced at the Process Development Center (PDC) were bought from University of Maine, Orono, ME, USA with a solids concentration of ~23.5 wt. % (Batch #122) in water. CNF/CMC pastes with a solid concentration of ~18 wt. % were prepared using a high shear torque mixer (Plasti-Corder PL 2100 Electronic Torque Rheometer, C. W. Brabender, South Hackensack NJ) equipped with Banbury-type mixing blades. The CNF/CMC pastes were prepared by first adding 52 g of CNF with a solid concentration of ~23.5 wt % into the mixer. The added CNF was mixed at 120 rpm and a temperature of 60° C. until the output torque curve reached a plateau. The required amount of processing aid was gradually added until a ratio of 0.1:1 was reached (CMC/CNF, both dry weight). Water was also added as needed into the paste to control the final solids concentration and replace the lost water during mixing (~1 wt. % solids increase for a mixing time of 40 min). During mixing, the rotor speed was held at 120 rpm. The paste was mixed until the CMC was fully incorporated into the paste which was signaled by a constant rise in torque followed by a plateau region. On average ~66 grams of CNF/CMC paste could be processed in less than an hour.

Mold. A stainless-steel mold of a teacup was designed using Inventor and 3D printed with the shape of a miniature plate. The mold had an overall high of 11 mm, maximum diameter of 36.5 mm and minimum diameter of 14.5 mm. The dimensions were such that a complex form could be shaped using the minimum amount of material at our disposal. Nevertheless, the researchers at this time do not find any reason to believe scaling the dimensions of the process will translate into unpredicted problems.

Process. A total of 10 g of wet CNF/CMC paste with a solids concentration of ~18 wt % was placed into the cavity of the mold, later the top part of the mold was place on top and press with the aid of a warn press at 70° C. (Model 3856 Bench Top Laboratory Manual Press, Carver Inc, IN, USA) until some material came out (ensuring the total distribution of the material). Every 10 minutes more pressure was applied to account for the shrinkage of the material as it was losing water. After approximately one hour, the mold was removed from inside the press and left to cool down on a countertop. After 10 to 15 minutes, the final product was removed from inside the mold. It is important to notice that applying higher rates of drying (i.e. 100° C. or more), translate into CNF migrating out of solution, and showing some irregularities in the end product, reason why slower rates are preferred and dependent of the shape and thickness of the final product.

Data/Pictures

Figure 13:
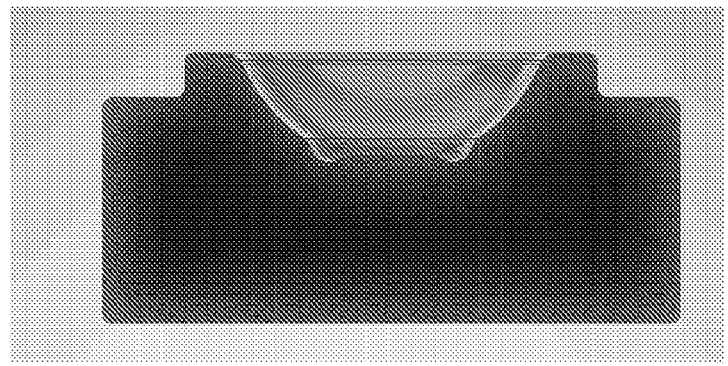
FIG. 13 illustrates a stainless steel cavity mold for the molding process.
Figure 14:
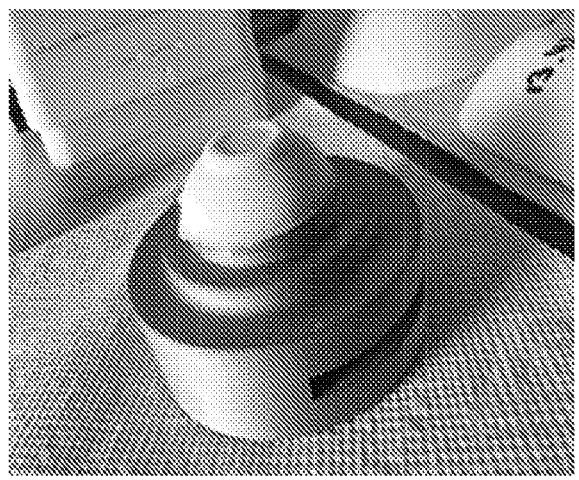
FIG. 14 illustrates a nearly dry CNF-CMC molded teacup in a 3D printed stainless steel mold.
Figure 15:
FIG. 15 illustrates CNF+CMC mixture already shaped into the desired mold. Different color on the surface show CNF coming out of solution as the mold dries.

FIG. 13 shows a molded teacup fabricated by using a 3D printed stainless steel mold and CNF+CMC material as it came out of the Brabender. The material shows high shapeability and smooth surfaces. FIG. 14 shows a nearly dry CNF-CMC molded teacup in a 3D printed stainless steel mold. FIG. 15 shows CNF+CMC mixture already shaped into the desired mold. Different color on the surface show CNF coming out of solution as the mold dries.

We claim:

1. A continuous processing method to prepare a sheet comprising cellulose nanofibril (CNF) and carboxymethyl cellulose salt (CMC), wherein the method comprises:
   providing a paste comprising a homogenous aqueous mixture comprising CMC and 10-30 wt. % CNF, wherein the paste has a total solid content of 10-30 wt. %, and the homogenous aqueous mixture has a CMC to CNF weight ratio range of 0.03:1 to 0.3:1;
   providing an extruder;
   loading the to the extruder; and
   continuously extruding the paste to provide a wet sheet comprising CNF and CMC, wherein the wet sheet has a CMC to CNF weight ratio range of 0.03:1 to 0.3:1.

2. The method of claim 1, wherein the paste with a solid content of 10-30 wt. % is obtained in a high shear torque mixer to achieve a full incorporation between CNF and CMC, and the full incorporation of CNF and CMC is characterized by a steady rise in torque until a plateau of torque value is achieved, wherein the paste is capable of being prepared in less than one hour.

3. The method of claim 1, wherein the wet sheet is warm pressed to provide a dry sheet comprising CMC to CNF weight ratio range of 0.03:1 to 0.3:1.

4. The method of claim 1, wherein the extruder is a single screw extruder.

5. The method of claim 1, wherein a maximum sheet production rate of 7.45±0.47 kg/h in a wet state or 1.14±0.072 kg/h in a dry state can be achieved at a screw speed of 110 rpm when the homogenous aqueous mixture has about 15 wt. % total solids.

6. A molding method to prepare a molded material comprising cellulose nanofibril (CNF) and carboxymethyl cellulose salt (CMC), wherein the method comprises:
   providing a paste comprising a homogenous aqueous mixture comprising CNF and CMC, wherein the paste has a solid content of 10-30 wt. %, and CMC CNF weight ratio range of 0.03:1 to 0.3:1;
   providing a mold;
   loading the paste comprising cellulose nanofibril (CNF) and carboxymethyl cellulose (CMC) to the mold; and
   molding the paste comprising CNF and CMC to provide a material with a desired shape comprising CNF and CMC, wherein the material has a CMC to CNF weight ratio range of 0.03:1 to 0.3:1.

7. A continuous processing method to prepare a sheet comprising cellulose nanofibril (CNF) and carboxymethyl cellulose salt (CMC), wherein the method comprises:
   continuously extruding a paste comprising a homogenous aqueous mixture comprising CMC and 10-30 wt. % CNF, wherein the homogenous aqueous mixture has a total solid content of 10-30 wt. %, and the homogenous aqueous mixture has a CMC to CNF weight ratio range of 0.03:1 to 0.3:1.

* * * * *